United States Patent
Kyo et al.

(10) Patent No.: US 11,207,918 B2
(45) Date of Patent: Dec. 28, 2021

(54) MODIFIED CONJUGATED DIENE-BASED POLYMER AND RUBBER COMPOSITION THEREOF, AND TIRE

(71) Applicants: Asahi Kasei Kabushiki Kaisha, Tokyo (JP); Bridgestone Corporation, Tokyo (JP)

(72) Inventors: Miki Kyo, Tokyo (JP); Shinichi Sekikawa, Tokyo (JP)

(73) Assignees: Asahi Kasei Kabushiki Kaisha, Tokyo (JP); Bridgestone Corporation, Tokyo (JP)

(*) Notice: Subject to any disclaimer, the term of this patent is extended or adjusted under 35 U.S.C. 154(b) by 93 days.

(21) Appl. No.: 16/326,523

(22) PCT Filed: Aug. 7, 2017

(86) PCT No.: PCT/JP2017/028654
§ 371 (c)(1),
(2) Date: Feb. 19, 2019

(87) PCT Pub. No.: WO2018/034195
PCT Pub. Date: Feb. 22, 2018

(65) Prior Publication Data
US 2019/0184747 A1 Jun. 20, 2019

(30) Foreign Application Priority Data
Aug. 19, 2016 (JP) .............................. JP2016-161379

(51) Int. Cl.
| | | |
|---|---|---|
| C08C 19/25 | (2006.01) | |
| C08L 9/00 | (2006.01) | |
| C08L 91/00 | (2006.01) | |
| B60C 1/00 | (2006.01) | |
| C08C 19/22 | (2006.01) | |
| C08C 19/44 | (2006.01) | |
| C08L 15/00 | (2006.01) | |
| C08L 19/00 | (2006.01) | |
| B60C 11/00 | (2006.01) | |
| C08F 236/10 | (2006.01) | |
| C08G 83/00 | (2006.01) | |
| C08K 3/36 | (2006.01) | |
| C08L 9/06 | (2006.01) | |

(52) U.S. Cl.
CPC .............. *B60C 1/0016* (2013.01); *B60C 1/00* (2013.01); *B60C 1/0025* (2013.01); *B60C 1/0041* (2013.01); *B60C 11/0008* (2013.01); *C08C 19/22* (2013.01); *C08C 19/25* (2013.01); *C08C 19/44* (2013.01); *C08F 236/10* (2013.01); *C08G 83/004* (2013.01); *C08K 3/36* (2013.01); *C08L 9/00* (2013.01); *C08L 9/06* (2013.01); *C08L 15/00* (2013.01); *C08L 19/006* (2013.01); *C08L 91/00* (2013.01); *B60C 2001/005* (2013.01)

(58) Field of Classification Search
CPC .......... C08L 15/00; C08L 19/06; C08L 21/00; C08L 47/00; C08L 9/00; C08L 9/06; C08F 36/04; C08F 8/42; C08F 236/10; C08C 19/25; C08C 19/44
See application file for complete search history.

(56) References Cited

U.S. PATENT DOCUMENTS

| | | | | |
|---|---|---|---|---|
| 10,434,821 B2 * | 10/2019 | Kyo | .................... | B60C 1/0041 |
| 10,519,254 B2 * | 12/2019 | Kyo | .................... | C08K 3/013 |
| 2003/0199669 A1 | 10/2003 | Saito et al. | | |
| 2006/0173138 A1 | 8/2006 | Hogan et al. | | |
| 2013/0018151 A1 | 1/2013 | Maeda et al. | | |
| 2013/0023624 A1 | 1/2013 | Sekikawa et al. | | |

FOREIGN PATENT DOCUMENTS

| | | |
|---|---|---|
| DE | 102012013708 A | 1/2013 |
| EP | 2003146 A2 | 12/2008 |
| EP | 2799454 A | 11/2014 |
| JP | H11-189616 A | 7/1999 |
| JP | 2003-171418 A | 6/2003 |
| JP | 2005-290355 A | 10/2005 |
| JP | 2008-527150 A | 7/2008 |
| JP | 2011-195639 A | 10/2011 |
| JP | 2013-082771 A | 5/2013 |
| JP | 2014-177517 A | 9/2014 |
| JP | 2014-177519 A | 9/2014 |
| JP | 2015-120785 A | 7/2015 |
| JP | 2015-120789 A | 7/2015 |
| WO | 2007/114203 A1 | 10/2007 |
| WO | 01/023467 A1 | 4/2011 |
| WO | 2011/129425 A1 | 10/2011 |

OTHER PUBLICATIONS

International Search Report issued in corresponding International Patent Application No. PCT/JP2017/028654 dated Nov. 7, 2017.
International Preliminary Report on Patentability issued in corresponding International Patent Application No. PCT/JP2017/028654 dated Feb. 19, 2019.
European Search Report issued in corresponding European Patent Application No. 17841420.7 dated Jul. 10, 2019.

* cited by examiner

*Primary Examiner* — Irina S Zemel
*Assistant Examiner* — Jeffrey S Lenihan
(74) *Attorney, Agent, or Firm* — Morgan, Lewis & Bockius LLP

(57) ABSTRACT

A modified conjugated diene-based polymer containing:
having a weight average molecular weight of $20 \times 10^4$ or more and $300 \times 10^4$ or less,
having a star-branched structure with a conjugated diene-based polymer chain bonded to a modifier residue,
wherein the modifier residue has at least 4 silicon atoms, and alkoxy groups and/or hydroxyl groups and
the conjugated diene-based polymer chain is bonded to the silicon atom,
wherein the number of alkoxy groups and/or hydroxyl groups in the modifier residue is larger than the number of the silicon atoms on average.

17 Claims, No Drawings

MODIFIED CONJUGATED DIENE-BASED POLYMER AND RUBBER COMPOSITION THEREOF, AND TIRE

TECHNICAL FIELD

The present invention relates to a modified conjugated diene-based polymer and a rubber composition thereof, and a tire.

BACKGROUND ART

So far, there are increasing demands for reduction of fuel consumption in vehicles, and improvement of materials of a vehicle tire, particularly, of a tire tread in contact with the ground is required.

Recently, development of a material having low rolling resistance, namely, a material having a low hysteresis loss property, has been demanded.

Besides, in order to reduce the weight of a tire, it is necessary to reduce the thickness of a tread portion of the tire, and there is a demand for a material having high abrasion resistance.

On the other hand, a material used for a tire tread is required, from the viewpoint of safety, to be excellent in wet skid resistance and to have practically sufficient fracture characteristics.

Examples of the material meeting the above-described requirements include a material comprising a rubber and a reinforcing filler such as carbon black or silica.

If, for example, a material comprising silica is used, balance between the low hysteresis loss property and the wet skid resistance can be improved.

Besides, an attempt has been made to reduce a hysteresis loss by improving dispersibility of silica in a material through introduction of a functional group having affinity or reactivity with silica into a molecular end of a rubber having high mobility, and further by reducing the mobility of the molecular end of the rubber through a bond with a silica particle.

For example, Patent Literature 1 proposes a modified diene-based rubber obtained by reacting a modifier having a glycidylamino group with a polymer active end.

Besides, Patent Literatures 2 to 4 propose a modified diene-based rubber obtained by reacting an alkoxysilane having an amino group with a polymer active end, and a composition of such a modified diene-based rubber and silica.

Furthermore, Patent Literatures 5 and 6 propose a polymer functionalized through a reaction of a cyclic aza-sila cycle compound with a polymer active end.

Still furthermore, Patent Literature 7 proposes a diene-based rubber obtained through a coupling reaction between a polymer active end and a multi-functional silane compound.

CITATION LIST

Patent Literature

[Patent Literature 1] International Publication No. WO01/23467
[Patent Literature 2] Japanese Patent Laid-Open No. 2005-290355
[Patent Literature 3] Japanese Patent Laid-Open No. 11-189616
[Patent Literature 4] Japanese Patent Laid-Open No. 2003-171418
[Patent Literature 5] National Publication of International Patent Application No. 2008-527150
[Patent Literature 6] International Publication No. WO11/129425
[Patent Literature 7] International Publication No. WO07/114203

SUMMARY OF INVENTION

Technical Problem

Silica has, however, a disadvantage of being inferior in dispersibility to carbon black because it has a hydrophilic surface and hence has low affinity with a conjugated diene-based rubber when compared to carbon black having a hydrophobic surface. Therefore, silica, when used, needs to additionally comprise a silane coupling agent or the like to improve the dispersibility by imparting a bond between the silica and the rubber.

Besides, the material in which a functional group having high reactivity with silica is introduced into a molecular end of the rubber poses a problem in tending to be degraded in processability, for example, it becomes difficult to knead because a reaction with a silica particle proceeds during a kneading process to increase the viscosity of a resultant composition, or surface coarseness or sheet breakage is easily caused when formed into a sheet after the kneading. In addition, when such a material is used to obtain a vulcanizate, in particular, when a rubber material comprising an inorganic filler such as silica is used to obtain a vulcanizate, the balance between the low hysteresis loss property and the wet skid resistance, and the abrasion resistance are not sufficient, hence problematic.

Therefore, an object of the present invention is to provide a modified conjugated diene-based polymer that is particularly excellent in balance between a low hysteresis loss property and wet skit resistance and in abrasion resistance when in the form of a vulcanizate, and has practically sufficient fracture characteristics.

Solution to Problem

The present inventors made earnest studies to solve the above-described problems of the related arts, and as a result, it was found that a modified conjugated diene-based polymer having a weight average molecular weight in a prescribed range, having a star-branched structure with a conjugated diene-based polymer chain bonded to a modifier residue, wherein the modifier residue has at least 4 silicon atoms and alkoxy groups and/or hydroxyl groups and each conjugated diene-based polymer chain is bonded to the silicon atom, wherein the number of the alkoxy groups and/or the hydroxyl groups in the modifier residue is larger than the number of the silicon atoms on average, is excellent in the balance between a low hysteresis loss property and the wet skit resistance and in abrasion resistance when in the form of a vulcanizate, and has practically sufficient fracture characteristics, and thus, the present invention was accomplished.

Specifically, the present invention provides the following:
[1]
A modified conjugated diene-based polymer
having a weight average molecular weight of $20 \times 10^4$ or more and $300 \times 10^4$ or less, and having a star-branched structure with a conjugated diene-based polymer chain bonded to a modifier residue,
wherein the modifier residue has at least 4 silicon atoms, and alkoxy groups and/or hydroxyl groups and
the conjugated diene-based polymer chain is bonded to the silicon atom,
wherein the number of alkoxy groups and/or hydroxyl groups in the modifier residue is larger than the number of the silicon atoms on average.

[2]
The modified conjugated diene-based polymer according to [1], wherein the number of alkoxy groups and/or hydroxyl groups in the modifier residue is 1.2 times or more of the number of the silicon atoms on average.

[3]
The modified conjugated diene-based polymer according to [1] or [2], wherein the modifier residue has at least 2 nitrogen atoms and at least 4 silicon atoms.

[4]
The modified conjugated diene-based polymer according to any one of [1] to [3], represented by the following general formula (1) or general formula (2);

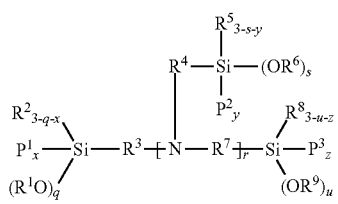

(1)

wherein $P^1$ to $P^3$ each independently represent a conjugated diene-based polymer chain; $R^3$, $R^4$ and $R^7$ each independently represent an alkylene group having 1 to 20 carbon atoms; $R^2$, $R^5$ and $R^8$ each independently represent an alkyl group having 1 to 20 carbon atoms; and $R^1$, $R^6$ and $R^9$ each independently represent a hydrogen atom or an alkyl group having 1 to 20 carbon atoms; x, y and z each independently represent an integer of 1 to 2, q, s and u each independently represent an integer of 0 to 3, r represents an integer of 2 to 6, and the number of the conjugated diene-based polymer chain $(x+(y\times r)+z)$ is an integer of 3 to 20; the number of the alkoxy groups $(q+(s\times r)+u)$ exceeds the number of the silicon atoms, and a ratio of the number of the alkoxy groups to the number of the conjugated diene-based polymer chains $(q+(s\times r)+u)/(x+(y\times r)+z)$ exceeds 0.5;

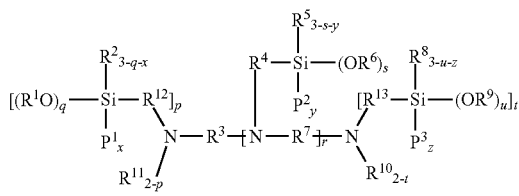

(2)

wherein $P^1$ to $P^3$ each independently represent a conjugated diene-based polymer chain; $R^3$, $R^4$, $R^7$ $R^{12}$ and $R^{13}$ each independently represent an alkylene group having 1 to 20 carbon atoms; $R^2$, $R^5$ and $R^8$ each independently represent an alkyl group having 1 to 20 carbon atoms; $R^1$, $R^6$ and $R^9$ each independently represent a hydrogen atom or an alkyl group having 1 to 20 carbon atoms; and $R^{10}$ and $R^{11}$ each independently represent a hydrogen atom or an alkyl group having 1 to 20 carbon atoms; x, y and z each independently represent an integer of 1 to 2; p and t each independently represent an integer of 1 to 2; q, s and u each independently represent an integer of 0 to 3; r represents an integer of 0 to 6; the number of the conjugated diene-based polymer chain $((x\times p)+(y\times r)+(z\times t))$ is an integer of 3 to 20; the number of the alkoxy groups $((q\times p)+(s\times r)+(u\times t))$ exceeds the number of the silicon atoms, and a ratio of the number of the alkoxy groups to the number of the conjugated diene-based polymer chains $((q\times p)+(s\times r)+(u\times t))/((x\times p)+(y\times r)+(z\times t))$ exceeds 0.5.

[5]
An oil-extended modified conjugated diene-based polymer comprising:
100 parts by mass of the modified conjugated diene-based polymer according to any one of [1] to [4], and
1 to 60 parts by mass of an extender oil.

[6]
A rubber composition comprising:
a rubber component and 5.0 parts by mass or more and 150 parts by mass of a filler based on 100 parts by mass of the rubber component,
wherein the rubber component comprises 10% by mass or more of the modified conjugated diene-based polymer according to any one of [1] to [5] based on a total amount of the rubber component.

[7]
A tire comprising the rubber composition according to [6].

Advantageous Effects of Invention

According to the present invention, a modified conjugated diene-based polymer having particularly excellent balance between a low hysteresis loss property and the wet skit resistance and abrasion resistance when in the form of a vulcanizate, and practically sufficient fracture characteristics can be obtained.

DESCRIPTION OF EMBODIMENTS

Now, an embodiment for practicing the present invention (hereinafter referred to as the "present embodiment") will be described in detail. The following embodiment is illustrative merely, and is not intended to limit the present invention to the following description. The present invention can be appropriately modified within the scope thereof.

[Modified Conjugated Diene-based Polymer]

The modified conjugated diene-based polymer of the present embodiment is a modified conjugated diene-based polymer having a weight average molecular weight of $20\times10^4$ or more and $300\times10^4$ or less, and having a star-branched structure with a conjugated diene-based polymer chain bonded to a modifier residue, wherein the modifier residue has at least 4 silicon atoms, and alkoxy groups and/or hydroxyl groups and the conjugated diene-based polymer chain is bonded to the silicon atom, wherein the number of the alkoxy groups and/or the hydroxyl groups in the modifier residue is larger than the number of the silicon atoms on average.

The number of the alkoxy groups and/or the hydroxyl groups in the modifier residue is preferably 1.2 times or more of the number of the silicon atoms on average.

A modified conjugated diene-based polymer of the present embodiment has a weight average molecular weight of $20 \times 10^4$ or more and $300 \times 10^4$ or less.

If the weight average molecular weight is $20 \times 10^4$ or more, the balance between the low hysteresis loss property and the wet skid resistance and the abrasion resistance obtained when in the form of a vulcanizate are excellent.

Besides, if the weight average molecular weight is $300 \times 10^4$ or less, the processability and dispersibility of a filler obtained when used for obtaining a vulcanizate can be excellent, and practically sufficient fracture characteristics can be attained.

A weight average molecular weight of the modified conjugated diene-based polymer is preferably $50 \times 10^4$ or more, more preferably $64 \times 10^4$ or more, and further preferably $80 \times 10^4$ or more. The weight average molecular weight is preferably $250 \times 10^4$ or less, preferably $180 \times 10^4$ or less, and more preferably $150 \times 10^4$ or less.

Weight average molecular weights (Mw) of a modified conjugated diene-based polymer and a conjugated diene-based polymer described later can be measured by measuring a chromatogram using a GPC measurement apparatus and an RI detector, and on the basis of a calibration curve obtained using standard polystyrene. Specifically, the measurement can be performed by a method described in examples below.

A weight average molecular weight of a modified conjugated diene-based polymer of the present embodiment can be controlled in the above-described numerical ranges by adjusting a molecular weight of a conjugated diene-based polymer chain controlled by a ratio of the amount of a polymerization initiator to be used and the amount of a monomer to be used and the type and the amount of a modifier to be used.

<Conjugated Diene-Based Polymer Chain and Star-Branched Structure>

A modified conjugated diene-based polymer of the present embodiment has a star-branched structure wherein a plurality of conjugated diene-based polymer chains are bonded to a modifier residue.

The conjugated diene-based polymer chain is a constituent unit of the modified conjugated diene-based polymer, and is a constituent unit derived from the conjugated diene-based polymer and generated, for example, through a reaction between the conjugated diene-based polymer and a modifier described later.

The star-branched structure in a modified conjugated diene-based polymer of the present embodiment is a structure wherein 3 or more molecules of conjugated diene-based polymer chains are bonded to a modifier residue.

<Modifier Residue>

The modifier residue in a modified conjugated diene-based polymer of the present embodiment is a constituent unit of the modified conjugated diene-based polymer and bonded to a conjugated diene-based polymer chain, and is a constituent unit derived from a modifier and generated, for example, through a reaction between the conjugated diene-based polymer and a modifier described later.

The modifier residue has at least 4 silicon atoms and each conjugated diene-based polymer chain is bonded to the silicon atom.

Besides, the modifier residue has alkoxy groups and/or hydroxyl groups, and the alkoxy groups and/or the hydroxyl groups are bonded to the silicon atoms of the modifier residue wherein the total number of the alkoxy groups and/or the hydroxyl groups is larger than the number of the silicon atoms on average.

If the modifier residue has the above-described structure, the modified conjugated diene-based polymer has particularly excellent balance between a low hysteresis loss property and the wet skit resistance and abrasion resistance when in the form of a vulcanizate, and has practically sufficient fracture characteristics.

In the modifier residue in a modified conjugated diene-based polymer of the present embodiment, when alkoxy groups and/or hydroxyl groups exceeding the number of silicon atoms are bonded to silicon atoms, alkoxysilyl groups or silanol groups formed by these can undergo a condensation reaction.

It is noted that, in all the modifier residues in the modified conjugated diene-based polymer, the number of alkoxy groups and/or hydroxyl groups does not need to be larger than the number of silicon atoms, and the sum of the number of alkoxy groups and/or hydroxyl groups may exceed the sum of the number of silicon atoms.

The structure has preferably the alkoxy group and/or the hydroxyl group exceeding one on average bonded to each of the silicon atoms. The total number of alkoxy groups and/or hydroxyl groups bonded to silicon atoms is preferably 1.2 times or more on average, more preferably 1.5 times or more, and further preferably 2 times or more of the number of silicon atoms.

The number of alkoxy groups and/or hydroxyl groups bonded to the silicon atoms can be calculated from addition amounts of a polymerization initiator and a modifier added in a polymerization step.

In the modifier residue, when the number of alkoxy groups and/or hydroxyl groups is larger than the number of silicon atoms on average, the balance between the low hysteresis loss property and the wet skid resistance tends to be excellent.

The number of alkoxy groups and/or hydroxyl groups with respect to the silicon atoms in the modifier residue can be controlled by adjusting an addition amount of a modifier when reacting the modifier to a conjugated diene-based polymer having an active end.

In a modified diene-based polymer of the present embodiment, the modifier residue has at least 4 silicon atoms.

The structure can be formed by a modifier to be used.

If the modifier residue has at least 4 silicon atoms therein, the molecular weight impacting on the fracture characteristics and abrasion resistance can be maintained even when an addition amount of a modifier with respect to a polymerization initiator is suitably adjusted, and also a concentration, in the modifier residue, of the alkoxy group and/or the hydroxyl group effective on the dispersibility of silica and the low hysteresis loss property can be increased, and thus a vulcanizate with excellent balance between the low hysteresis loss property and the wet skid resistance and the abrasion resistance can be obtained.

A modified conjugated diene-based polymer of the present embodiment tends to be obtained by reacting 1 mol of a modifier with 3 mol or more of a conjugated diene-based polymer and by using a modifier, as long as the structure thereof is concerned, having a functional group bonded to the conjugated diene-based polymer at the silicon atom and having at least 4 silicon atoms.

In the modifier residue, when a conjugated diene-based polymer having an active end is added so that a ratio of the mole number thereof to the mole number of all reactable groups in a modifier added is larger than 1.0 so as for the number of alkoxy groups and/or hydroxyl groups to be larger than the number of silicon atoms on average, a concentration of the alkoxy group and/or the hydroxyl group in the modifier residue is increased and the dispersibility of silica tends not to be lost even when a blending amount of silica is increased.

The modifier residue in a modified diene-based polymer of the present embodiment preferably has at least 2 nitrogen atoms and at least 4 silicon atoms therein.

When the modifier residue has at least 2 nitrogen atoms therein, nucleophilicity to silica added as a filler when forming a compound tends to be enhanced and the dispersibility of silica tends to be improved. In this modified conjugated diene-based polymer, the energy loss especially caused by the friction between fillers and the fracture of silica particles is reduced when used for obtaining a vulcanizate, and thus excellent balance between the low hysteresis loss property and the wet skit resistance tends to be obtained.

In the modifier residue, when addition amounts of a polymerization initiator and a modifier are adjusted and added so that the number of alkoxy groups and/or hydroxyl groups is larger than the number of silicon atoms on average, a concentration of the alkoxy group and/or the hydroxyl group in the modifier residue is increased, reactivity with silica added as a filler is high, and the dispersibility of silica is improved due to the hydrophobic effect of silica, and thus excellent processability tends to be obtained. The modified conjugated diene-based polymer has particularly excellent balance between a low hysteresis loss property and the wet skit resistance and abrasion resistance when in the form of a vulcanizate, and has practically sufficient fracture characteristics.

In general, a small size silica having a large nitrogen adsorption specific surface area obtained by the BET adsorption method has the silica surface difficult to be hydrophobized tending to be degraded in dispersibility and processability. In a composition wherein silica as a filler is added to a conjugated diene-based polymer having at least 2 nitrogen atoms in the modifier residue, the dispersibility of silica tends to be improved even when silica has a small size with degraded dispersibility because the nucleophilicity of silica is enhanced. Besides, reactivity with a silanol group on the silica surface is high due to the high concentration effect of the alkoxy group and/or the hydroxyl group in the modifier residue, and reaggregation is suppressed due to a high hydrophobic effect of the silica surface, the dispersibility of the small size silica is improved, and thus excellent processability is obtained when forming a compound.

The modified conjugated diene-based polymer having such a structure tends to be obtained by using a modifier of a structure having at least 2 nitrogen atoms and at least 4 silicon atoms.

A modified diene-based polymer of the present embodiment is more preferably represented by the following general formula (1) or general formula (2).

(1)

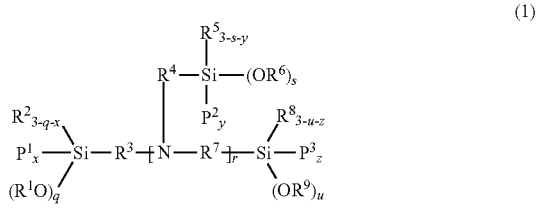

wherein $P^1$ to $P^3$ each independently represent a conjugated diene-based polymer chain; $R^3$, $R^4$ and $R^7$ each independently represent an alkylene group having 1 to 20 carbon atoms; $R^2$, $R^5$ and $R^8$ each independently represent an alkyl group having 1 to 20 carbon atoms; and $R^1$, $R^6$ and $R^9$ each independently represent a hydrogen atom or an alkyl group having 1 to 20 carbon atoms; x, y and z each independently represent an integer of 1 to 2, q, s and u each independently represent an integer of 0 to 3, r represents an integer of 2 to 6, and the number of conjugated diene-based polymer chain $(x+(y \times r)+z)$ is an integer of 3 to 20; the number of alkoxy groups $(q+(s \times r)+u)$ exceeds the number of silicon atoms, and a ratio of the number of alkoxy groups to the number of conjugated diene-based polymer chains $(q+(s \times r)+u)/(x+(y \times r)+z)$ exceeds 0.5;

(2)

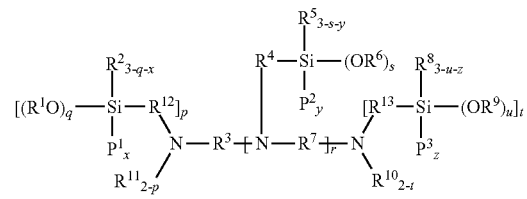

wherein $P^1$ to $P^3$ each independently represent a conjugated diene-based polymer chain; $R^3$, $R^4$, $R^7$ $R^{12}$ and $R^{13}$ each independently represent an alkylene group having 1 to 20 carbon atoms; $R^2$, $R^5$ and $R^8$ each independently represent an alkyl group having 1 to 20 carbon atoms; $R^1$, $R^6$ and $R^9$ each independently represent a hydrogen atom or an alkyl group having 1 to 20 carbon atoms; and $R^{10}$ and $R^{11}$ each independently represent a hydrogen atom or an alkyl group having 1 to 20 carbon atoms; x, y and z each independently represent an integer of 1 to 2; p and t each independently represent an integer of 1 to 2; q, s and u each independently an integer of 0 to 3; r represents an integer of 0 to 6; the number of conjugated diene-based polymer chain $((x \times p)+(y \times r)+(z \times t))$ is an integer of 3 to 2; the number of alkoxy groups $((q \times p)+(s \times r)+(u \times t))$ exceeds the number of silicon atoms, and a ratio of the number of alkoxy groups to the number of conjugated diene-based polymer chains $((q \times p)+(s \times r)+(u \times t))/((x \times p)+(y \times r)+(z \times t))$ exceeds 0.5.

When a modified conjugated diene-based polymer of the present embodiment is a polymer represented by general formula (1) or general formula (2), the polymer has particularly excellent balance between the low hysteresis loss property and the wet skit resistance and abrasion resistance when in the form of a vulcanizate, and has practically sufficient fracture characteristics.

The modified conjugated diene-based polymer having the structure of general formula (1) or general formula (2) can be obtained by using a modifier having a specific structure described later through a reaction of a diene-based polymer chain with the modifier in a specific ratio.

The modified conjugated diene-based polymer of the present embodiment is more preferably a modified conjugated diene-based polymer wherein a modifier residue has at least 2 nitrogen atoms and at least 4 silicon atoms. In this case, the modified conjugated diene-based polymer provides much more effect of the present embodiment.

The modified conjugated diene-based polymer having the structure tends to be obtained by using a modifier, as long as the structure thereof is concerned, of a structure having at least 2 nitrogen atoms and at least 4 silicon atoms.

In the modified conjugated diene-based polymer of the present embodiment, a monomer constituting a polymer chain is constituted by a conjugated diene compound or a conjugated diene compound and copolymerizable other monomers.

The conjugated diene compound is preferably a conjugated diene compound having 4 to 12 carbon atoms, and examples include, but not limited to, 1,3-butadiene, isoprene, 2,3-dimethyl-1,3-butadiene, 1,3-pentadiene, 3-methyl-1,3-pentadiene, 1,3-hexadiene, and 1,3-heptadiene.

Among these, 1,3-butadiene and isoprene are preferred from the viewpoint of industrial availability.

One of these compounds may be singly used, or two or more of these may be used together.

The copolymerizable other monomer is preferably, for example, a vinyl aromatic compound, and more preferably styrene.

In the modified conjugated diene-based polymer of the present embodiment, a molecular weight distribution (Mw/Mn) corresponding to a ratio of a weight average molecular weight (Mw) to a number average molecular weight (Mn) is preferably 1.1 or more and 3.5 or less. A modified conjugated diene-based polymer having a molecular weight distribution falling in this range tends to be more excellent in the processability when used for obtaining a vulcanizate and more excellent in the abrasion resistance when in the form of a vulcanizate. The molecular weight distribution (Mw/Mn) is preferably 1.5 or more and 3.0 or less.

The number average molecular weights, the weight average molecular weights, and the molecular weight distributions of the modified conjugated diene-based polymer and the conjugated diene-based polymer described later are measured by methods described in the examples below.

In the modifier residue in a modified conjugated diene-based polymer of the present embodiment, the sum of alkoxy groups and/or hydroxyl groups bonded to silicon atoms in the modifier residue exceeds the number of silicon atoms, but alkoxysilyl groups or silanol groups formed by these can undergo a condensation reaction.

In this case, the condensation reaction is a mutual bonding reaction of alkoxysilyl groups or silanol groups in the presence of water. As a result, 2 or more molecules may be condensed and bonded to thereby form a branched modified diene-based polymer. It is noted that, in a modified conjugated diene-based polymer of the present embodiment, alkoxysilyl groups or silanol groups do not need to be in a condensed state, but the number of alkoxysilyl groups and/or silanol groups in the modifier residue may be larger than the number of silicon atoms.

Condensation reaction may be performed under alkaline, neutral or acidic condition, and may be performed in the presence or absence of a condensation accelerator.

The condensation reaction, in the case of performing under alkaline condition, is performed in the presence of, for example, an alkaline metal compound, specifically performed in the presence of sodium hydroxide, potassium hydroxide, or lithium hydroxide.

The condensation reaction, in the case of performing under acidic condition, is performed in the presence of, for example, an acidic compound, and specifically it is preferable to be performed in the presence of an inorganic acid such as hydrochloric acid, sulfuric acid, or nitric acid; a carboxylic acid such as acetic acid or formic acid; silicon tetrachloride or the like.

A known condensation accelerator is used as the condensation accelerator, and preferably, for example, those comprising a metal element, and more preferably a compound comprising at least one metal species belonging to the group 2 to the group 15 in the periodic table.

The condensation accelerator comprising the above-described metal element is preferably, for example, those comprising at least one species selected from Ti, Sn, Bi, Zr and Al, and is alkoxide, carboxylate or acetylacetonato complex salt of the metal.

A condensation accelerator comprising Ti as the metal component preferably used is, for example, alkoxide, carboxylate or acetylacetonato complex salt of titanium (Ti).

Examples include specifically tetrakis(2-ethyl-1,3-hexanediolate)titanium, tetrakis(2-ethylhexoxy)titanium, titanium di-n-butoxide (bis-2,4-pentanedionate).

A condensation accelerator comprising Sn as the metal component is preferably, for example, a tin compound having an oxidation state of 2 represented by $Sn(OCOR^{31})_2$ (wherein $R^{31}$ is an alkyl group having 2 to 19 carbon atoms), a tin compound having an oxidation state of 4 represented by $R^{32}_x SnA^5_y B^1_{4-y-x}$ (wherein $R^{32}$ is an aliphatic hydrocarbon group having 1 to 30 carbon atoms, x is an integer of 1 to 3, y is 1 or 2, $A^5$ is a group selected from a carboxyl group having 2 to 30 carbon atoms, a β-dicarbonyl group having 5 to 20 carbon atoms, a hydrocarbyloxy group having 3 to 20 carbon atoms, and a siloxy group trisubstituted with a hydrocarbyl group having 1 to 20 carbon atoms and/or a hydrocarbyloxy group having 1 to 20 carbon atoms, and $B^1$ is a hydroxyl group or halogen).

More specifically, examples of carboxylate of the tin include dicarboxylate of bivalent tin, dicarboxylate of tetravalent dihydrocarbyl tin (including bis(hydrocarbyl dicarboxylic acid)salt), bis(β-diketonate), alkoxy halide, monocarboxylate hydroxide, alkoxy(trihydrocarbylsiloxide), alkoxy(dihydrocarbylalkoxysiloxide), bis(trihydrocarbylsiloxide), and bis(dihydrocarbylalkoxysiloxide).

The hydrocarbyl group bonded to tin is preferably those having 4 or more carbon atoms, and more preferably those having 4 to 8 carbon atoms.

Besides, the condensation accelerator comprising Zr, Bi or Al as the metal component, for example, alkoxide, carboxylate, or acetylacetonato complex salt of these metals are (a) to (e) below.

(a) Carboxylate of bismuth
(b) Alkoxide of zirconium
(c) Carboxylate of zirconium
(d) Alkoxide of aluminum
(e) Carboxylate of aluminum Examples include tris(2-ethylhexanoate)bismuth, tetra n-propoxyzirconium, tetra n-butoxyzirconium, bis(2-ethylhexanoate) zirconiumoxide, bis(oleate)zirconiumoxide, triisopropoxyaluminum, tri sec-butoxyaluminum, tris(2-ethylhexanoate)aluminium, tris(stearate)aluminum, zirconium tetrakis(acetylacetonate), and aluminum tris(acetylacetonate).

A blending amount (amount to be used) of the condensation accelerator is preferably 0.1 to 10 parts by mass, and more preferably 0.5 to 5 parts by mass, based on 100 parts by mass of a rubber component in a rubber composition described later. When the amount of a condensation accelerator to be used falls in the above-described range, the condensation reaction proceeds efficiently.

Condensation reaction is preferably performed in aqueous medium, a temperature during the condensation reaction is preferably 85 to 180° C., more preferably 100 to 170° C., and further preferably 110 to 150° C.

When a temperature during the condensation reaction is set to the above-described ranges, the condensation reaction can efficiently proceed and be completed, and the quality degradation over time of a modified conjugated diene-based polymer to be obtained can be suppressed.

It is noted that a condensation reaction time is preferably about 5 minutes to about 10 hours, and more preferably about 15 minutes to about 5 hours. When a condensation reaction time is set to the above-described ranges, the condensation reaction can be readily completed.

A pressure of the reaction system during the condensation reaction is preferably 0.01 to 20 MPa, and more preferably 0.05 to 10 MPa.

A condensation reaction is not especially limited in the type, and may be performed using a batch reactor or performed continuously using an apparatus such as a multistage continuous reactor. Besides, the condensation reaction and the desolvation may be performed simultaneously.

In a production process of a modified conjugated diene-based polymer of the present embodiment, the condensation reaction can be simultaneously performed when steam stripping, and it is a preferable method.

[Method for Producing Modified Conjugated Diene-Based Polymer]

A preferable method for producing a modified conjugated diene-based copolymer of the present embodiment includes:

a polymerization step of polymerizing at least a conjugated diene compound in the presence of an organolithium compound to give a conjugated diene-based polymer, and a modification step of reacting 3 mol or more of the conjugated diene-based polymer with 1 mol of a modifier having three or more functional groups bondable to the conjugated diene-based polymer at a silicon atom and at least 4 silicon atoms.

A modified conjugated diene-based polymer of the present embodiment tends to be obtained steadily by the production method.

(Polymerization Step)

The polymerization step in the method for producing a modified conjugated diene-based polymer of the present embodiment polymerizes at least a conjugated diene compound in the presence of an organolithium compound to give a conjugated diene-based polymer.

The polymerization step is preferably performed by polymerization through a growth reaction by living anionic polymerization, and thus, a conjugated diene-based polymer having an active end can be obtained, and there is a tendency that a modified diene-based polymer having a high modification ratio can be obtained.

<Conjugated Diene-Based Polymer>

A conjugated diene-based polymer to be produced in the polymerization step is obtained by polymerizing at least a conjugated diene compound as a monomer, and obtained by copolymerizing a conjugated diene compound and other copolymerizable monomers if necessary.

The conjugated diene compound is not especially limited as long as it is a polymerizable conjugated diene compound, and is preferably a conjugated diene compound comprising 4 to 12 carbon atoms per molecule, and more preferably a conjugated diene compound comprising 4 to 8 carbon atoms. Examples of such a conjugated diene compound include, but are not limited to, 1,3-butadiene, isoprene, 2,3-dimethyl-1,3-butadiene, 1,3-pentadiene, 3-methyl-1,3-pentadiene, 1,3-hexadiene and 1,3-heptadiene.

Among these, 1,3-butadiene and isoprene are preferred from the viewpoint of industrial availability. One of these compounds may be singly used, or two or more of these may be used together.

The copolymerizable other monomers are not especially limited as long as they are monomers copolymerizable with a conjugated diene compound, and are preferably vinyl-substituted aromatic compounds.

Examples of the monovinyl aromatic compound include, but are not limited to, styrene, p-methylstyrene, a-methyl-styrene, vinyl ethyl benzene, vinyl xylene, vinyl naphthalene and diphenyl ethylene. Among these, styrene is preferred from the viewpoint of industrial availability.

One of these compounds may be singly used, or two or more of these may be used together.

If the conjugated diene compound and/or the vinyl-substituted aromatic compound comprises any of allenes, acetylenes and the like as an impurity, it is apprehended that the reaction in the reaction step described later may be impaired. Therefore, the sum of content concentrations (masses) of these impurities is preferably 200 ppm or less, more preferably 100 ppm or less, and further preferably 50 ppm or less.

Examples of the allenes include propadiene and 1,2-butadiene. Examples of the acetylenes include ethyl acetylene and vinyl acetylene.

The conjugated diene-based polymer may be a random copolymer or a block copolymer. In order to form the conjugated diene-based polymer as a rubber-like polymer, the conjugated diene compound is used in an amount of preferably 40% by mass or more and more preferably 55% by mass or more based on the amount of all monomers used in the conjugated diene-based polymer.

Examples of the random copolymer include, but are not limited to, a random copolymer comprising two or more conjugated diene compounds such as a butadiene-isoprene random copolymer, and a random copolymer comprising conjugated diene and the vinyl-substituted aromatic compound such as a butadiene-styrene random copolymer, an isoprene-styrene random copolymer or a butadiene-isoprene-styrene random copolymer. A composition distribution of each monomer contained in a copolymer chain is not especially limited, and examples include a completely random copolymer whose composition is almost statistically random, and a tapered (gradient) random copolymer whose composition is distributed in a tapered manner. A bonding mode of the conjugated diene, namely, the composition of a 1,4-bond, a 1,2-bond or the like may be homogeneous or distributed.

Examples of the block copolymer include, but are not limited to, a two-block (diblock) copolymer consisting of two blocks, a three-block (tri-block) copolymer consisting of three blocks, and a four-block (tetra-block) copolymer consisting of four blocks. A polymer constituting every block may be a polymer comprising one monomer or a copolymer comprising two or more monomers.

Assuming that a polymer block comprising 1,3-butadiene is expressed as "B", a copolymer of 1,3-butadiene and isoprene is expressed as "B/I", a copolymer of 1,3-butadiene and styrene is expressed as "B/S" and a polymer block comprising styrene is expressed as "S", the block copolymer is expressed as a B-B/I two-block copolymer, a B-B/S two-block copolymer, a S-B two-block copolymer, a B-B/S-S three-block copolymer, a S—B-S three-block copolymer, a S—B-S-B four-block copolymer or the like.

In the above-described formula, there is no need to always clearly define a boundary between blocks. Besides, if one polymer block is a copolymer comprising two monomers A and B, the monomers A and B may be distributed homogeneously or in a tapered manner in the block.

<Polymerization Initiator>

In the polymerization step, a prescribed polymerization initiator is used.

A polymerization initiator usable is an organolithium compound, and preferably an organomonolithium compound.

Examples of the organomonolithium compound include, but are not limited to, a low molecular weight compound and an organomonolithium compound of a solubilized oligomer. Another example of the organomonolithium compound includes a compound having, as a bonding mode between an organic group and lithium therein, a carbon-lithium bond, a nitrogen-lithium bond or a tin-lithium bond.

The amount of the organomonolithium compound to be used as a polymerization initiator is preferably determined on the basis of the molecular weight of the target conjugated diene-based polymer or modified conjugated diene-based polymer.

There is a tendency that a ratio of the amount of a monomer such as the conjugated diene compound to be used to the amount of the polymerization initiator to be used relates to the degree of polymerization, namely, the number average molecular weight and/or the weight average molecular weight. Accordingly, in order to increase the molecular weight, adjustment may be made to reduce the amount of the polymerization initiator, and in order to reduce the molecular weight, the adjustment may be made to increase the amount of the polymerization initiator.

The organomonolithium compound is preferably an alkyl lithium compound having a substituted amino group or substituted amino lithium compound from the viewpoint that it is used in one method for introducing a nitrogen atom into the conjugated diene-based polymer. In this case, a conjugated diene-based polymer having a nitrogen atom comprising an amino group at a polymerization starting end is obtained. The substituted amino group refers to an amino group having no active hydrogen or having a structure in which active hydrogen is protected.

The organolithium compound is preferably an organomonolithium compound, which may or may not have a substituted amino group in a molecule. The organomonolithium compound is preferably an alkyl lithium compound from the viewpoint of industrial availability and controllability of the polymerization reaction. In this case, a conjugated diene-based polymer having an alkyl group at a polymerization starting end can be obtained.

Examples of the alkyl lithium compound include, but are not limited to, n-butyllithium, sec-butyllithium, tert-butyllithium, n-hexyllithium, benzyllithium, phenyllithium and stilbene lithium. From the viewpoint of the industrial availability and the controllability of the polymerization reaction, the alkyl lithium compound is preferably n-butyllithium or sec-butyllithium.

The substituted amino group refers to an amino group wherein hydrogens in the amino group are each independently substituted with at least one selected from the group consisting of an alkyl group having 1 to 12 carbon atoms, a cycloalkyl group having 3 to 14 carbon atoms and an aralkyl group having 6 to 20 carbon atoms, and a protection group, and the substituent groups may form a ring structure together with the adjacent nitrogen atom to which they bond, and the substituent group in such a case is an alkyl group having 5 to 12 carbon atoms, a part of which may have a unsaturated bond or a branch structure. It is noted that an alkyl-substituted silyl group is preferred as the protection group.

Examples of the polymerization reaction mode employed in the polymerization step include, but are not limited to, batch and continuous polymerization reaction modes.

In the continuous mode, one reactor or two or more connected reactors can be used. As a reactor for the continuous mode, for example, a tank or tubular reactor equipped with a stirrer is used. It is preferable, in the continuous mode, that a monomer, an inert solvent and a polymerization initiator are continuously fed to the reactor, a polymer solution comprising a polymer is obtained in the reactor, and the polymer solution is continuously discharged. As a reactor for the batch mode, for example, a tank reactor equipped with a stirrer is used. It is preferable, in the batch mode, that a monomer, an inert solvent and a polymerization initiator are fed, the monomer is continuously or intermittently additionally fed if necessary during the polymerization, a polymer solution comprising a polymer is obtained in the reactor, and the polymer solution is discharged after completing the polymerization. In the present embodiment, in order to obtain a conjugated diene-based polymer having an active end at a high ratio, the continuous mode in which a polymer can be continuously discharged to be supplied to a next reaction in a short period of time is preferably employed.

In the polymerization step, it is preferable to polymerize a monomer in an inert solvent.

Examples of the solvent include hydrocarbon-based solvents such as saturated hydrocarbon and aromatic hydrocarbon. Specific examples of the hydrocarbon-based solvent include, but are not limited to, aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon comprising a mixture of any of these. Impurities of allenes and acetylenes are preferably treated with an organic metal compound before the solvent is supplied to the polymerization reaction because thus, a conjugated diene-based polymer having an active end in a high concentration tends to be obtained, and a modified conjugated diene-based polymer having a high modification ratio tends to be obtained.

In the polymerization step, a polar compound may be added. Thus, there is a tendency that an aromatic vinyl compound can be randomly copolymerized with the conjugated diene compound, and a polar compound can be used also as a vinylation agent for controlling a microstructure of a conjugated diene portion. Besides, there is a tendency that it is advantageous for acceleration of the polymerization reaction and the like.

Examples of the polar compound include, but are not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene and 2,2-bis(2-oxolanyl) propane; tertiary amine compounds such as tetramethylethylenediamine, dipiperidinoethane, trimethylamine, triethylamine, pyridine and quinuclidine; alkaline metal alkoxide compounds such as potassium-tert-amylate, potassium-tert-butylate, sodium-tert-butylate and sodium amylate; and phosphine compounds such as triphenylphosphine. One of these polar compounds may be singly used, or two or more of these may be used together.

The amount of the polar compound to be used is not especially limited but can be selected in accordance with the purpose or the like, and is preferably 0.01 mol or more and 100 mol or less per mol of the polymerization initiator. Such a polar compound (a vinylation agent) can be used, as a microstructure modifier for a conjugated diene portion of the polymer, in an appropriate amount in accordance with a desired amount of vinyl bond. There is a tendency that many polar compounds simultaneously have an effective randomizing effect in copolymerization of a conjugated diene compound and an aromatic vinyl compound, and can be used for adjusting the distribution of the aromatic vinyl compound and adjusting the amount of a styrene block. As a method for randomizing the conjugated diene compound and the aromatic vinyl compound, for example, a method as described in Japanese Patent Laid-Open No. 59-140211 in which a copolymerization reaction is started with the whole amount of styrene and a part of 1,3-butadiene with the rest of 1,3-butadiene intermittently added during the copolymerization reaction may be employed.

In the polymerization step, a polymerization temperature is preferably a temperature at which the living anionic polymerization proceeds, and from the viewpoint of productivity, is more preferably 0° C. or more and further preferably 120° C. or less. If the polymerization temperature falls in this range, there is a tendency that a reaction amount of the coupling agent reacted to the active end can be sufficiently attained after completing the polymerization. A temperature of 50° C. or more and 100° C. or less is furthermore preferred, and a temperature of 60° C. or more and 80° C. or less is suitable.

The conjugated diene-based polymer obtained by the polymerization step before the modification reaction step has a Mooney viscosity, measured at 110° C., of preferably 10 or more and 90 or less, more preferably 15 or more and 85 or less, and further preferably 20 or more and 60 or less. If the Mooney viscosity falls in this range, the modified conjugated diene-based polymer of the present embodiment tends to be excellent in the processability and the abrasion resistance.

The amount of bound conjugated diene in the conjugated diene-based polymer obtained in the polymerization step or the modified conjugated diene-based polymer of the present embodiment is not especially limited, and is preferably 40% by mass or more and 100% by mass or less, and more preferably 55% by mass or more and 80% by mass or less.

Besides, the amount of bound aromatic vinyl in the conjugated diene-based polymer obtained in the polymerization step or the modified conjugated diene-based polymer of the present embodiment is not especially limited, and is preferably 0% by mass or more and 60% by mass or less, and more preferably 20% by mass or more and 45% by mass or less.

If the amount of bound conjugated diene and the amount of bound aromatic vinyl respectively fall in the above-described ranges, the repulsion elasticity when in the form of a vulcanizate tends to be more excellent.

Here, the amount of bound aromatic vinyl can be measured using ultraviolet absorption of a phenyl group, and based on this, the amount of bound conjugated diene can be also obtained. Specifically, these amounts can be measured in accordance with a method described in the examples below.

In the conjugated diene-based polymer obtained in the polymerization step or the modified conjugated diene-based polymer of the present embodiment, the amount of vinyl bond in a conjugated diene bond unit is not especially limited, and is preferably 10% by mole or more and 75% by mole or less, and more preferably 20% by mole or more and 65% by mole or less.

If the amount of vinyl bond falls in the above-described range, the repulsion elasticity tends to be more excellent.

Here, if the modified diene-based polymer is a copolymer of butadiene and styrene, the amount of vinyl bond (the amount of a 1,2-bond) in a butadiene bond unit can be obtained by Hampton method (R. R. Hampton, Analytical Chemistry, 21, 923 (1949)). Specifically, it can be measured by a method described in the examples below.

As for the microstructure of the modified conjugated diene-based polymer, if the amounts of the aforementioned bonds in the modified conjugated diene-based polymer fall respectively in the above-described ranges and the glass transition temperature of the modified conjugated diene-based polymer is −45° C. or more and −15° C. or less, there is a tendency that a vulcanizate more excellent in the balance between the low hysteresis loss property and the wet skid resistance can be obtained.

The glass transition temperature is defined as a peak top (an inflection point) of a DSC differential curve obtained by recording a DSC curve during temperature increase in a prescribed range in accordance with ISO 22768:2006. Specifically, it can be measured in accordance with a method described in the examples below.

If the modified conjugated diene-based polymer of the present embodiment is a conjugated diene-aromatic vinyl copolymer, it preferably comprises a few or no blocks in which 30 or more aromatic vinyl units are chained. More specifically, if the copolymer is a butadiene-styrene copolymer, in employing a known method in which the copolymer is decomposed by Kolthoff method (a method described by I. M. Kolthoff, et al., J. Polym. Sci. 1, 429 (1946)) to analyze the amount of polystyrene insoluble in methanol, blocks in each of which 30 or more aromatic vinyl units are chained are preferably 5.0% by mass or less, and more preferably 3.0% by mass or less based on the total amount of the copolymer.

If the conjugated diene-based polymer obtained in the polymerization step is a conjugated diene-aromatic vinyl copolymer, a large proportion of an aromatic vinyl unit is preferably present singly. Specifically, if the copolymer is a butadiene-styrene copolymer, when the copolymer is decomposed by employing a method through ozonolysis known as a method of Tanaka et al., (Polymer, 22, 1721 (1981)) to analyze a styrene chain distribution by GPC, it is preferable that the amount of isolated styrene to the whole amount of bound styrene is 40% by mass or more, and that the amount of a chain styrene structure consisting of 8 or more chained styrene is 5.0% by mass or less. In this case, a resultant vulcanized rubber attains excellent performance of particularly low hysteresis loss.

(Modification Step)

In a modification step in a preferable method for producing the modified conjugated diene-based polymer of the present invention, a method is performed wherein "a modifier having three or more bondable functional groups, having at least 2 nitrogen atoms and at least 4 silicon atoms in a molecule thereof and having alkoxysilyl groups whose number exceeds the number of the silicon atoms" is reacted with an active end of the conjugated diene-based polymer obtained in the polymerization step to leave alkoxysilyl groups exceeding the number of silicon atoms on average, and further the modification step is performed so that the mole number of the bondable functional groups including alkoxysilyl groups (hereinafter sometimes referred to as the "functional group") with respect to the mole number of the active end of the conjugated diene-based polymer to be used exceeds as many number as the remaining alkoxysilyl groups.

Examples of the functional group bondable to an active end of the conjugated diene-based polymer include an alkoxysilyl group, a halogen group, an epoxy group, and a carbonyl group.

Besides, the functional group bondable to an active end of the conjugated diene-based polymer in a modifier to be used is preferably an alkoxysilyl group and a halogen group, and more preferably an alkoxysilyl group.

Besides, in the modifier residue, a remained alkoxysilyl group tends to be changed to silanol (a Si-OH group) with water or the like used in the finishing.

The modified conjugated diene-based polymer of general formula (1), which is a more preferable structure of the modified conjugated diene-based polymer of the present embodiment, is obtained by reacting a living end of the conjugated diene-based polymer obtained by the polymerization step with a polyfunctional modifier represented by the following general formula (3).

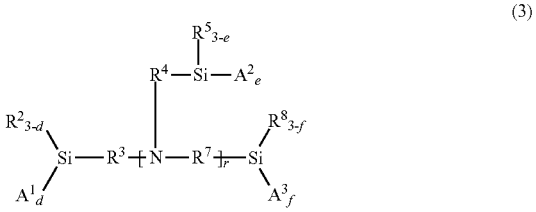

(3)

wherein $A^1$ to $A^3$ each independently represent a functional group bondable to a conjugated diene-based polymer chain, the alkoxy group of the functional groups is more than the number of silicon atoms, d, e and f each independently represent an integer of 1 to 3, and in the case of 2 or more, $A^1$, $A^2$ and $A^3$ may be a different functional group, respectively.

$R^3$, $R^4$ and $R^7$ each independently represent an alkylene group having 1 to 20 carbon atoms, $R^2$, $R^5$ and $R^8$ each independently represent an alkyl group having 1 to 20 carbon atoms, and r represents an integer of 2 to 6.

Besides, $A^1$ to $A^3$ are functional groups bondable to the conjugated diene-based polymer chain, wherein at least alkoxy group has a larger number than the number of silicon atoms, and other functional groups may have any structures other than the alkoxy group.

The functional groups are preferably an alkoxy group, a halogen group, an epoxy group, and a carbonyl group, and more preferably all are alkoxy groups.

Examples of the modifier of general formula (3) include, if the functional groups are all alkoxysilyl groups, tetrakis (3-trimethoxysilylpropyl)-1,3-propanediamine, tetrakis(3-triethoxysilylpropyl)-1,3-propanediamine, tetrakis(3-trimethoxysilylpropyl)-1,3-bisaminomethylcyclohexane, tetrakis(3-trimethoxysilylpropyl)-1,6-hexamethylenediamine, pentakis(3-trimethoxysilylpropyl)-diethylenetriamine, pentakis(3-trimethoxysilylpropyl)-dipropylenetriamine, and bis(3-trimethoxysilylpropyl)-bis(3-dimethoxymethylsilylpropyl)-1,3-propanediamine.

Besides, examples of the modifier of general formula (3) include, if the functional groups are an alkoxysilyl group and other functional groups, $N^1,N^1$-bis(3-dichloromethylsilylpropyl)-$N^2,N^2$-bis(3-trimethoxysilylpropyl)-1,3-propanediamine and $N^1$, $N^1$, $N^3$, $N^3$-tetra(3-trimethoxysilylpropyl)-$N^2$-(3-dichloromethylsilylpropyl)-diethylenetriamine.

The modified conjugated diene-based polymer of general formula (2), which is a more preferable structure of the modified conjugated diene-based polymer of the present embodiment, can be produced by a method of reacting an active end of the conjugated diene-based polymer obtained in the polymerization step with a polyfunctional modifier represented by the following general formula (4).

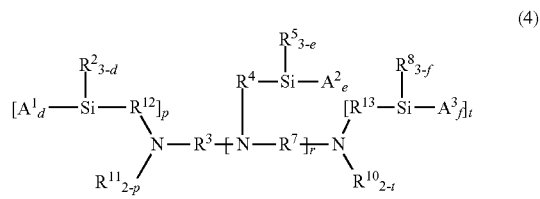

(4)

wherein $A^1$ to $A^3$ each independently represent a functional group bondable to a conjugated diene-based polymer chain, the alkoxy group of the functional groups is more than the number of silicon atoms, d, e and f each independently represent an integer of 1 to 3, and in the case of 2 or more, $A^1$, $A^2$ and $A^3$ may be a different functional group, respectively.

$R^3$, $R^4$, $R^7$, $R^{12}$ and $R^{13}$ each independently represent an alkylene group having 1 to 20 carbon atoms, $R^2$, $R^5$ and $R^8$ each independently represent an alkyl group having 1 to 20 carbon atoms, and r represents an integer of 0 to 6; $R^{10}$ and $R^{11}$ each independently represent a hydrogen atom or an alky group having 1 to 20 carbon atoms.

Examples of the modifier of general formula (4) include, if the functional groups are all alkoxysilyl groups, tetrakis (3-trimethoxysilylpropyl)-1,3-propanediamine, tetrakis(3-triethoxysilylpropyl)-1,3-propanediamine, tetrakis(3-trimethoxysilylpropyl)-1,3-bisaminomethylcyclohexane, tetrakis(3-trimethoxysilylpropyl)-1,6-hexamethylenediamine, pentakis(3-trimethoxysilylpropyl)-diethylenetriamine, pentakis(3-trimethoxysilylpropyl)-dipropylenetriamine, and bis(3-trimethoxysilylpropyl)-bis(3-dimethoxymethylsilylpropyl)-1,3-propanediamine. Besides, examples include, if the functional groups are an alkoxysilyl group and other functional groups, $N^1,N^1$-bis(3-dichloromethylsilylpropyl)-$N^2,N^2$-bis(3-trimethoxysilylpropyl)-1,3-propanediamine, $N^1$, $N^1$, $N^3$, $N^3$-tetra(3-trimethoxysilylpropyl)-$N^2$-(3-dichloromethylsilylpropyl)-diehtylenetriamine.

When the functional group in the modifier are all alkoxysilyl groups, the number of alkoxysilyl groups in the modifier is preferably the sum of the number of conjugated diene-based polymers to be bonded and the number of alkoxysilyl groups to be remained.

When the functional groups in the modifier are an alkoxysilyl group and other functional groups, it is preferable to use a method in which alkoxysilyl groups remain unreacted due to a difference in the reaction speed. For example, in the case of an alkoxysilyl group and a halogen group, the reaction of a halogen group is fast and thus the reaction between a conjugated diene-based polymer end and the halogen group occurs first, whereby the alkoxy group tends to remain. In that case, a method is preferred in which the number of halogens in the modifier is the same as or less than the number of conjugated diene-based polymers to be bonded, and the number of alkoxysilyl groups in the modifier is the same as or larger than the number of alkoxysilyl groups to be remained. It is noted that, when halogen groups form a halogenated silyl group and when halogen groups remain unreacted, the halogen groups tend to be hydrolyzed in alkaline water and form a silanol group. When halogen is used, neutralization may be required in some cases so that halogen or a hydrogen halide does not become corrosive.

In the modification step, all of the alkoxysilyl groups in the modifier do not necessarily react in some cases. For example, if the active end of 3 mol of the nitrogen-containing conjugated diene-based polymer is reacted with 1 mol of trialkoxysilane group having three alkoxy groups per silicon atom, there is a tendency that 1 mol of the alkoxysilyl group remains unreacted although the reaction with the nitrogen-containing conjugated diene-based polymer occurs up to 2 mol. This can be confirmed because 1 mol of the nitrogen-containing conjugated diene-based polymer remains without reacting as an unreacted polymer.

For an addition amount of the modifier, the ratio of the mole number of all reactable groups in the modifier added to the mole number of the conjugated diene-based polymer having an active end is preferably more than the mole number of all reactable groups in the modifier added/the mole number of the conjugated diene-based polymer having an active end=more than 1.0 and 10.0 or less, more preferably 1.5 or more and 8.0 or less, and more preferably 2.0 or more and 5.0 or less. When an addition amount of the modifier is controlled to be in these ranges, a high modification ratio tends to be obtained.

However, the reactable group is counted as 2 mol with respect to 1 mol of the trialkoxysilyl group, and the reactable group is counted as 1 mol with respect to 1 mol of dialkoxysilyl.

A ratio of the alkoxy group or the hydrosilyl group to silicon atoms in the modified conjugated diene-based polymer can be calculated from an addition amount of the modifier with respect to an addition amount of a polymerization initiator.

A modification ratio of a modified conjugated diene-based polymer of the present embodiment is preferably 30% by mass or more, more preferably 50% by mass or more, and further preferably 70% by mass or more.

When a modification ratio is 30% by mass or more, the dispersibility of a filler, for example, silica added when forming a vulcanizate, tends to be improved.

A modification ratio can be measured by a method described in examples below.

A reaction temperature employed in the modification step is preferably a temperature equivalent to the polymerization temperature of the conjugated diene-based polymer, more preferably 0° C. or more and 120° C. or less, and further preferably 50° C. or more and 100° C. or less. Besides, a temperature change after the polymerization step until the addition of the modifier is preferably 10° C. or less, and more preferably 5° C. or less.

A reaction time employed in the modification step is preferably 10 seconds or more, and more preferably 30 seconds or more. A time from the end of the polymerization step to the start of the modification step is preferably shorter, and more preferably 5 minutes or less. Thus, there is a tendency that a high modification ratio can be obtained.

Mixing performed in the modification step may be either mechanical stirring or stirring with a static mixer or the like. If the polymerization step is performed in the continuous mode, the modification step is preferably performed also in the continuous mode. As a reactor used in the modification step, for example, a tank or tubular reactor equipped with a stirrer is used. The modifier may be diluted with an inert solvent and continuously supplied to the reactor. If the polymerization step is performed in the batch mode, the modification step may be performed by a method in which the polymerization reactor is charged with the modifier, or a method in which the polymer is transferred to another reactor for performing the modification step.

In the method for producing the modified conjugated diene-based polymer of the present embodiment, a deactivator, a neutralizer or the like may be added if necessary to the resultant copolymer solution after the modification step.

Examples of the deactivator include, but are not limited to, water; and alcohols such as methanol, ethanol and isopropanol.

Examples of the neutralizer include, but are not limited to, carboxylic acids such as stearic acid, oleic acid and versatic acid (a mixture of highly branched carboxylic acids having 9 to 11 carbon atoms, mainly 10 carbon atoms); and an aqueous solution of an inorganic acid, and a carbon dioxide gas.

To the modified conjugated diene-based polymer of the present embodiment, from the viewpoint of preventing gel formation after the polymerization and of improving stability in the processing, a stabilizer for rubber is preferably added.

As the stabilizer for rubber, any of known stabilizers, not limited to the following, can be used, and preferable examples include antioxidants such as 2,6-di-tert-butyl-4-hydroxytoluene (BHT), n-octadecyl-3-(4'-hydroxy-3',5'-di-tert-butylphenol)propionate, and 2-methyl-4,6-bis[(octylthio)methyl]phenol.

A modified conjugated diene-based polymer of the present embodiment, in order to further improve the processability, may be in the form of an oil-extended modified conjugated diene-based polymer if necessary in which an extender oil is added to a modified conjugated diene-based polymer.

A preferable example of a method for adding an extender oil to the modified conjugated diene-based polymer includes, but is not limited to, a method in which an extender oil is added to the polymer solution to be mixed, and the resultant oil-extended copolymer solution is desolvated.

Examples of the extender oil include an aroma oil, a naphthenic oil and a paraffin oil. Among these oils, from the viewpoint of environmental safety, oil bleeding prevention and wet grip characteristics, an aroma-alternative oil comprising 3% by mass or less of a polycyclic aromatic (PCA) component according to the IP 346 is preferred. Examples of the aroma-alternative oil include TDAE (Threated Distillate Aromatic Extracts), MES (Mild Extraction Solvate) and the like mentioned in Kautschuk Gummi Kunststoffe 52 (12) 799 (1999), and RAE (Residual Aromatic Extracts).

The amount of the extender oil to be added is not especially limited, and is preferably 1 part by mass or more and 60 parts by mass or less, more preferably 5 parts by mass or more and 50 parts by mass or less, and further preferably 10 parts by mass or more and 37.5 parts by mass or less based on 100 parts by mass of the modified conjugated diene-based polymer.

As a method for recovering, from the polymer solution, the modified conjugated diene-based polymer of the present embodiment, any of known methods can be employed. Examples of the method include, but are not limited to, a method in which the polymer is filtered off after separating the solvent by steam stripping and the resultant is dehydrated and dried to recover the polymer, a method in which the solution is concentrated in a flashing tank and the resultant is devolatilized by a vent extruder or the like, and a method in which the solution is directly devolatilized using a drum dryer or the like.

The modified conjugated diene-based polymer of the present embodiment is suitably used as a vulcanizate.

Examples of the vulcanizate include a tire, a hose, a shoe sole, an anti-vibration rubber, a vehicle component and a seismic isolation rubber as well as high-impact polystyrene and a resin reinforcing rubber for an ABS resin or the like. In particular, the modified conjugated diene-based polymer is suitably used as a tread rubber composition for a tire.

The vulcanizate can be obtained, for example, by kneading the modified conjugated diene-based polymer of the present embodiment and, if necessary, an inorganic filler such as a silica-based inorganic filler or carbon black, a rubber-like polymer different from the modified conjugated diene-based polymer of the present embodiment, a silane coupling agent, a rubber softener, a vulcanizing agent, a vulcanization accelerator, a vulcanization aid or the like to obtain a modified conjugated diene-based polymer composition, and vulcanizing the thus obtained composition by heating.

[Rubber Composition]

A rubber composition of the present embodiment comprises a rubber component and a filler in an amount of 5.0 parts by mass or more and 150 parts by mass or less based on 100 parts by mass of the rubber component.

Besides, the rubber component comprises the above-described modified conjugated diene-based polymer of the present embodiment in an amount of 10% by mass or more based on the total amount (100% by mass) of the rubber component.

Furthermore, the filler preferably comprises a silica-based inorganic filler. If a silica-based inorganic filler is dispersed therein, the rubber composition tends to be more excellent in the processability obtained when used for obtaining a vulcanizate and be more excellent in the balance between the low hysteresis loss property and the wet skid resistance, the abrasion resistance obtained when in the form of a vulcanizate, and in the fracture strength.

If the rubber composition of the present embodiment is to be used as a vulcanized rubber for a tire, a vehicle component such as an anti-vibration rubber or for shoes or the like, a silica-based inorganic filler is preferably contained.

In the rubber composition of the present embodiment, a rubber-like polymer different from the modified conjugated diene-based polymer of the present embodiment (hereinafter simply referred to as the "rubber-like polymer") can be used in combination with the modified conjugated diene-based polymer of the present embodiment. Examples of such a rubber-like polymer include, but are not limited to, a conjugated diene-based polymer or a hydrogenated product thereof, a random copolymer of a conjugated diene-based compound and a vinyl aromatic compound or a hydrogenated product thereof, a block copolymer of a conjugated diene-based compound and a vinyl aromatic compound or a hydrogenated product thereof, a non-diene-based polymer and a natural rubber. Specific examples of the rubber-like polymer include, but are not limited to, a butadiene rubber or a hydrogenated product thereof, an isoprene rubber or a hydrogenated product thereof, styrene-based elastomers such as a styrene-butadiene rubber or a hydrogenated product thereof, a styrene-butadiene block copolymer or a hydrogenated product thereof, and a styrene-isoprene block copolymer or a hydrogenated product thereof, and an acrylonitrile-butadiene rubber or a hydrogenated product thereof.

Examples of the non-diene-based polymer include, but are not limited to, olefin-based elastomers such as an ethylene-propylene rubber, an ethylene-propylene-diene rubber, an ethylene-butene-diene rubber, an ethylene-butene rubber, an ethylene-hexene rubber and an ethylene-octene rubber, a butyl rubber, a brominated butyl rubber, an acrylic rubber, a fluorine rubber, a silicone rubber, a chlorinated polyethylene rubber, an epichlorohydrin rubber, an $\alpha$, $\beta$-unsaturated nitrile-acrylic acid ester-conjugated diene copolymer rubber, a urethane rubber and a polysulfide rubber.

Examples of the natural rubber include, but are not limited to, smoked sheets of RSS Nos. 3 to 5, SMR and epoxidized natural rubber.

The above-described various rubber-like polymers may be in the form of a modified rubber imparted with a functional group having polarity such as a hydroxyl group or an amino group. For use in a tire, a butadiene rubber, an isoprene rubber, a styrene-butadiene rubber, a natural rubber and a butyl rubber are preferably used.

The weight average molecular weight of the rubber-like polymer is, from the viewpoint of balance between the performance and the processing characteristics, preferably 2000 or more and 2000000 or less, and more preferably 5000 or more and 1500000 or less. Besides, a rubber-like polymer having a low molecular weight, namely, what is called a liquid rubber, can be used. One of these rubber-like polymers may be singly used, or two or more of these may be used together.

When the rubber composition comprises the modified conjugated diene-based polymer of the present embodiment and the rubber-like polymer, a content (in a mass ratio) of the modified conjugated diene-based polymer to the rubber-like polymer is, in terms of (the modified conjugated diene-based polymer/the rubber-like polymer), preferably 10/90 or more and 100/0 or less, more preferably 20/80 or more and 90/10 or less, and further preferably 50/50 or more and 80/20 or less. Accordingly, the rubber component comprises, based on the total amount (100 parts by mass) of the rubber component, the modified conjugated diene-based polymer in an amount of preferably 10 parts by mass or more and 100 parts by mass or less, more preferably 20 parts by mass or more and 90 parts by mass or less, and further preferably 50 parts by mass or more and 80 parts by mass or less. If the ratio of (the modified conjugated diene-based polymer/the rubber-like polymer) falls in the above-described range, the balance between the low hysteresis loss property and the wet skid resistance and the abrasion resistance when in the form of a vulcanizate are excellent, and the fracture strength is also high.

Examples of the filler used in the rubber composition of the present embodiment include, but are not limited to below, a silica-based inorganic filler, carbon black, a metal oxide, and a metal hydroxide. Among these, a silica-based inorganic filler is preferred. One of these may be singly used, or two or more of these may be used together.

A content of the filler in the rubber composition of the present embodiment is 5.0 parts by mass or more and 150 parts by mass, preferably 20 parts by mass or more and 100 parts by mass or less, and more preferably 25 parts by mass or more and 95 parts by mass or less based on 100 parts by mass of the rubber component comprising the modified conjugated diene-based polymer.

From the viewpoint of exhibiting the effect of the filler addition, the content of the filler is 5.0 parts by mass or more, and from the viewpoint that the filler is sufficiently dispersed to attain practically sufficient processability and mechanical strength of the composition, the content is 150 parts by mass or less.

The silica-based inorganic filler is not especially limited, any of known fillers can be used, a solid particle comprising $SiO_2$ or $Si_3Al$ as a constituent unit is preferred, and a solid particle comprising $SiO_2$ or $Si_3Al$ as a principal component of a constituent unit is more preferred. Here, the principal component refers to a component contained in the silica-based inorganic filler in an amount of 50% by mass or more, preferably 70% by mass or more, and more preferably 80% by mass or more.

Examples of the silica-based inorganic filler include, but are not limited to, silica, clay, talc, mica, diatomite, wollastonite, montmorillonite, zeolite and inorganic fibrous substances such as glass fiber. Besides, examples include a silica-based inorganic filler having a hydrophobized surface, and a mixture of a silica-based inorganic filler and an inorganic filler excluding silica. Among these, from the viewpoint of the strength and the abrasion resistance, silica and glass fiber are preferred, and silica is more preferred. Examples of the silica include dry silica, wet silica and synthetic silicate silica. Among these silica, wet silica is preferred from the viewpoint that it is excellent in the effect of improving the fracture characteristics and in the balance in the wet skid resistance.

From the viewpoint of obtaining practically good abrasion resistance and fracture characteristics of the rubber composition, a nitrogen adsorption specific surface area, obtained by the BET adsorption method, of the silica-based inorganic filler is preferably 100 $m^2/g$ or more and 300 $m^2/g$ or less, and more preferably 170 $m^2/g$ or more and 250 $m^2/g$ or less. Besides, a silica-based inorganic filler having a comparatively small specific surface area (for example, a specific surface area of 200 $m^2/g$ or less) and a silica-based inorganic filler having a comparatively large specific surface area (for example, a specific surface area of 200 $m^2/g$ or more) can be used in combination if necessary. In the present embodiment, if a silica-based inorganic filler having a comparatively large specific surface area (of, for example, 200 $m^2/g$ or more) is used in particular, the modified conjugated diene-based polymer tends to be well balanced between good fracture characteristics and the low hysteresis loss property because the dispersibility of silica can be thus so improved that an effect of improving the abrasion resistance is exhibited in particular.

The dispersibility of silica is described in detail in (Evaluation 5) "Silica Dispersibility" in an example described later, but can be easily evaluated by measuring, using a rotorless die type rheometer, strain dependence of the elastic modulus of a rubber composition in a state wherein a rubber, a filler and various products are kneaded before a vulcanization step.

A rubber composition with poor dispersibility of silica has a high elastic modulus in a low strain range, but an elastic modulus is reduced by the cohesive failure of silica when adding a strain, and thus there is a significant difference in the elastic modulus between the low strain range and the high strain range.

On the other hand, a rubber composition with good dispersibility of silica has a low elastic modulus from a low strain range, and thus a difference in the elastic modulus between the low strain range and the high strain range becomes small.

The content of the silica-based inorganic filler in the rubber composition is preferably 5.0 parts by mass or more and 150 parts mass, and more preferably 20 parts by mass or more and 100 parts by mass or less based on 100 parts by mass of a rubber component comprising the modified conjugated diene-based polymer. From the viewpoint of exhibiting the effect of the inorganic filler addition, the content of the silica-based inorganic filler is preferably 5.0 parts by mass or more, and from the viewpoint that the silica-based inorganic filler is sufficiently dispersed to obtain practically sufficient processability and mechanical strength of the rubber composition, the content is preferably 150 parts by mass or less.

Examples of the carbon black include, but are not limited to, carbon blacks of SRF, FEF, HAF, ISAF and SAF classes. Among these, a carbon black having a nitrogen adsorption specific surface area of 50 $m^2/g$ or more and dibutyl phthalate (DBP) oil absorption of 80 mL/100 g or less is preferred.

A content of the carbon black is preferably 0.5 parts by mass or more and 100 parts by mass or less, more preferably 3.0 parts by mass or more and 100 parts by mass or less, and further preferably 5.0 parts by mass or more and 50 parts by mass or less based on 100 parts by mass of the rubber component comprising the modified conjugated diene-based polymer. From the viewpoint of exhibiting performances required in use as a tire or the like such as dry grip performance and conductivity, the content of the carbon black is preferably 0.5 parts by mass or more, and from the viewpoint of dispersibility, the content is preferably 100 parts by mass or less.

The metal oxide refers to a solid particle comprising a principal component of a constituent unit represented by $M_xO_y$ (wherein M represents a metal atom, and x and y each independently represent an integer of 1 to 6). Examples of the metal oxide include, but are not limited to, alumina, titanium oxide, magnesium oxide and zinc oxide. Examples of the metal hydroxide include, but are not limited to, aluminum hydroxide, magnesium hydroxide and zirconium hydroxide.

The rubber composition may comprise a silane coupling agent. The silane coupling agent is preferably a compound that has a function to make close the interaction between the rubber component and the inorganic filler, has a group having affinity with or a binding property to both of the rubber component and the silica-based inorganic filler, and comprises, in one molecule, a sulfur bond portion and an alkoxysilyl group or silanol group portion. Examples of such a compound include bis-[3-(triethoxysilyl)-propyl]-tetrasulfide, bis-[3-(triethoxysilyl)-propyl]-disulfide and bis-[2-(triethoxysilyl)-ethyl]-tetrasulfide.

A content of the silane coupling agent is preferably 0.1 parts by mass or more and 30 parts by mass or less, more preferably 0.5 parts by mass or more and 20 parts by mass or less, and further preferably 1.0 part by mass or more and 15 parts by mass or less based on 100 parts by mass of the filler. If the content of the silane coupling agent falls in the aforementioned range, there is a tendency that the effect of the addition of the silane coupling agent can be more conspicuous.

The rubber composition may comprise a rubber softener from the viewpoint of improvement of the processability. As the rubber softener, a mineral oil or a liquid or low molecular weight synthetic softer is suitably used.

A mineral oil-based rubber softener, which is used for softening, expanding and improving processability of a rubber and is designated as a process oil or an extender oil, is a mixture of an aromatic ring, a naphthene ring and a paraffin chain, and one in which the number of carbon atoms of the paraffin chain is 50% or more of the number of all carbon atoms is designated as a paraffin-based softener, one in which the number of carbon atoms of the naphthene ring is 30% or more and 45% or less of the number of all carbon atoms is designated as a naphthene-based softener, and one in which the number of aromatic carbon atoms exceeds 30% of the number of all carbon atoms is designated as an aromatic-based softener.

If the modified conjugated diene-based polymer of the present embodiment is a copolymer of a conjugated diene compound and a vinyl aromatic compound, a rubber softener to be used is preferably one comprising an appropriate aromatic content because such a softener tends to fit with the copolymer.

A content of the rubber softener is preferably 0 part by mass or more and 100 parts by mass or less, more preferably 10 parts by mass or more and 90 parts by mass or less, and further preferably 30 parts by mass or more and 90 parts by mass or less based on 100 parts by mass of the rubber component comprising the modified conjugated diene-based polymer. If the content of the rubber softener is 100 parts by mass or less based on 100 parts by mass of the rubber component, there is a tendency that the bleeding out is suppressed and the stickiness of the surface of the rubber composition is suppressed.

Examples of a method for mixing the modified conjugated diene-based polymer and another rubber-like polymer, a silica-based inorganic filler, carbon black or another filler, a silane coupling agent, and an additive such as a rubber softener include, but are not limited to, a melt-kneading method using a general mixer such as an open roll, a banbury mixer, a kneader, a single shaft screw extruder, a twin shaft screw extruder or a multi-shaft screw extruder, and a method in which the respective components are melted and mixed followed by removal of a solvent by heating. Among these methods, the melt-kneading method using a roll, a banbury mixer, a kneader or an extruder is preferred from the viewpoint of productivity and high kneadability. Besides, either of a method in which the rubber component and filler, a silane coupling agent and an additive are kneaded all together or a method in which the components are mixed dividedly in plural times is applicable.

The rubber composition of the present embodiment may be a vulcanized composition having been vulcanized with a vulcanizing agent. Examples of the vulcanizing agent include, but are not limited to, radical generators such as organic peroxides and azo compounds, oxime compounds, nitroso compounds, polyamine compounds, sulfur and sulfur compounds. The sulfur compounds include sulfur monochloride, sulfur dichloride, disulfide compounds and high molecular weight polysulfide compounds.

A content of the vulcanizing agent is preferably 0.01 parts by mass or more and 20 parts by mass or less, and more preferably 0.1 parts by mass or more and 15 parts by mass or less based on 100 parts by mass of the rubber component. As a vulcanizing method, any of known methods is applicable, and a vulcanization temperature is preferably 120° C. or more and 200° C. or less, and more preferably 140° C. or more and 180° C. or less.

For the vulcanization, a vulcanization accelerator may be used if necessary. As the vulcanization accelerator, any of known materials can be used, and examples include, but are not limited to, sulphenamide-based, guanidine-based, thiuram-based, aldehyde-amine-based, aldehyde-ammonia-based, thiazole-based, thiourea-based and dithiocarbamate-based vulcanization accelerators. Besides, examples of a vulcanization aid include, but are not limited to, zinc oxide and stearic acid. A content of the vulcanization accelerator is preferably 0.01 parts by mass or more and 20 parts by mass or less, and more preferably 0.1 parts by mass or more and 15 parts by mass or less based on 100 parts by mass of the rubber component.

The rubber composition of the present embodiment may comprise, as long as the object of the present embodiment is not impaired, various additives such as other softener and other filler excluding those described above, a heat resistance stabilizer, an antistatic agent, a weathering stabilizer, an anti-ageing agent, a colorant and a lubricant.

As another softener, any of known softeners can be used. Examples of another filler include, but are not limited to, calcium carbonate, magnesium carbonate, aluminum sulfate and barium sulfate. As each of the heat resistance stabilizer, the antistatic agent, the weathering stabilizer, the anti-ageing agent, the colorant and the lubricant, any of known materials can be used.

[Tire]

A tire of the present embodiment comprises the rubber composition of the present embodiment.

The rubber composition of the present embodiment is applicable to, but not limited to, various tires such as a fuel-efficient tire, an all-season tire, a high-performance tire and a studless tire; and various tire portions such as a tread, a carcass, a sidewall and a bead. In particular, since the rubber composition of the present embodiment is excellent in the balance between the low hysteresis loss property and the wet skid resistance obtained when in the form of a vulcanizate and in the abrasion resistance, it is more suitably used as a tread of a fuel-efficient tire or a high-performance tire.

EXAMPLES

The present embodiment will now be described in more detail with reference to specific examples and comparative examples, and it is noted that the present embodiment is not limited to the following examples and comparative examples.

Various physical properties mentioned in the examples and comparative examples below were measured by the following methods.

(Physical Property 1) Amount of Bound Styrene

A modified conjugated diene-based polymer was used as a sample, 100 mg of the sample was dissolved in chloroform to be diluted to 100 mL, and the resultant was used as a measurement sample.

Based on the absorption of a phenyl group of styrene at the ultraviolet absorption wavelength (in the vicinity of 254 nm), the amount of bound styrene (% by mass) based on 100% by mass of the modified conjugated diene-based polymer used as the sample was measured (spectrophotometer "UV-2450" manufactured by Shimadzu Corporation).

(Physical Property 2) Microstructure of Butadiene Portion (Amount of 1,2-Vinyl Bond)

A modified conjugated diene-based polymer was used as a sample, 50 mg of the sample was dissolved in 10 mL of carbon disulfide, and the resultant was used as a measurement sample.

A solution cell was used to measure an infrared spectrum in a range of 600 to 1000 $cm^{-1}$, and in accordance with a calculation formula of the Hampton method (a method described by R. R. Hampton, Analytical Chemistry 21, 923 (1949)) based on absorbance at a prescribed wavelength, a microstructure of a butadiene portion, namely, the amount of a 1,2-vinyl bond (mol %) was obtained (Fourier transform infrared spectrophotometer "FT-IR230" manufactured by JASCO Corporation).

(Physical Property 3) Molecular Weights

A conjugated diene-based polymer or a modified conjugated diene-based polymer was used as a sample to measure a chromatogram using a GPC measurement apparatus (trade name "HLC-8320GPC" manufactured by Tosoh Corporation) including a series of three columns using a polystyrene-based gel as a filler and using an RI detector (trade name "HLC8020" manufactured by Tosoh Corporation), and on the basis of a calibration curve obtained using standard polystyrene, a weight average molecular weight (Mw), a number average molecular weight (Mn), and a molecular weight distribution (Mw/Mn) were obtained.

As an eluent, THF (tetrahydrofuran) comprising 5 mmol/L of triethylamine was used.

As the columns, three columns available under the trade name "TSKgel SuperMultpore HZ-H" manufactured by Tosoh Corporation were connected to one another, and a guard column available under the trade name "TSKguardcolumn SuperMP(HZ)-H" manufactured by Tosoh Corporation was connected to a previous stage of these.

Ten (10) mg of the sample for the measurement was dissolved in 10 mL of THF to obtain a measurement solution, and 10 µL of the measurement solution was injected into the GPC measurement apparatus for performing the measurement under conditions of an oven temperature of 40° C. and a THF flow rate of 0.35 mL/min.

(Physical Property 4) Mooney Viscosity of Polymer

A conjugated diene-based polymer or a modified conjugated diene-based polymer was used as a sample, and a Mooney viscosity was measured using a Mooney viscometer (trade name "VR1132" manufactured by Ueshima Seisakusho Co., Ltd.) and using an L-type rotor in accordance with JIS K6300.

A measurement temperature was set to 110° C. when the sample was a conjugated diene-based polymer before modification, and was set to 100° C. when the sample was a modified conjugated diene-based polymer.

First, the sample was preheated for 1 minute at a test temperature, the rotor was rotated at 2 rpm, and a torque measured 4 minutes after was defined as a Mooney viscosity ($ML_{(1+4)}$).

(Physical Property 5) Glass Transition Temperature (Tg)

A modified conjugated diene-based polymer was used as a sample to record a DSC curve in accordance with ISO 22768:2006 using a differential scanning calorimeter "DSC3200S" manufactured by MAC Science Co., Ltd. under a flow of helium at 50 mL/min during temperature increase from −100° C. at a rate of 20° C./min, and a peak top (an inflection point) of the thus obtained DSC differential curve was defined as a glass transition temperature.

(Physical Property 6) Modification Ratio

A modified conjugated diene-based polymer was used as a sample, and measurement was performed by applying a characteristic that a modified basic polymer component adsorbs to a GPC column using a silica-based gel as a filler.

A chromatogram obtained by measurement using a polystyrene-based column and a chromatogram obtained by measurement using a silica-based column were obtained by using a sample solution comprising the sample and low molecular weight internal standard polystyrene, and based on a difference between these chromatograms, an adsorption amount to the silica-based column was measured to obtain a modification ratio.

Specifically, the measurement was performed as described below.

Preparation of Sample Solution:

Ten (10) mg of a sample and 5 mg of standard polystyrene were dissolved in 20 mL of THF to obtain a sample solution.

GPC Measurement Conditions Using Polystyrene-Based Column:

An apparatus available under the trade name of "HLC-8320GPC" manufactured by Tosoh Corporation was used, THF comprising 5 mmol/L of triethylamine was used as an eluent, and 10 µL of the sample solution was injected into the apparatus to obtain a chromatogram by using an RI detector under conditions of a column oven temperature of 40° C. and a THF flow rate of 0.35 mL/min. Three columns available under the trade name "TSKgel SuperMultiporeHZ-H" manufactured by Tosoh Corporation were connected to one another, and a guard column available under the trade name "TSKguardcolumn SuperMP(HZ)-H" manufactured by Tosoh Corporation was connected to a previous stage of these.

GPC Measurement Conditions Using Silica-Based Column:

An apparatus available under the trade name of "HLC-8320GPC" manufactured by Tosoh Corporation was used, THF was used as an eluent, and 50 µL of the sample solution was injected into the apparatus to obtain a chromatogram by using an RI detector under conditions of a column oven temperature of 40° C. and a THF flow rate of 0.5 mL/min.

Columns available under the trade names "Zorbax PSM-1000S", "PSM-300S" and "PSM-60S" were connected to one another to be used, and a guard column available under the trade name "DIOL 4.6×12.5 mm 5 micron" was connected to a previous stage of these to be used.

Calculation Method for Modification Ratio:

Assuming that the whole peak area was 100, the peak area of the sample was P1 and the peak area of standard polystyrene was P2 in the chromatogram obtained by using the polystyrene-based column, and that the whole peak area was 100, the peak area of the sample was P3 and the peak area of standard polystyrene was P4 in the chromatogram obtained by using the silica-based column, a modification ratio (%) was obtained in accordance with the following expression:

Modification Ratio (%)=[1−(P2×P3)/(P1×P4)]×100 wherein P1+P2=P3+P4=100.

(Physical Property 7) Presence of Nitrogen Atom

The measurement was performed similarly to that described in the (Physical Property 6), and if the calculated modification ratio was 10% or more, it was determined that the sample had a nitrogen atom. Thus, it was confirmed that each of the modified conjugated diene-based polymers of Examples 1 to 5 and Comparative Examples 1, 3 and 5 to 8 had a nitrogen atom, and that the modified conjugated diene-based polymer of Comparative Example 2 and 4 did not have a nitrogen atom.

(Physical Property 8) Presence of Silicon Atom

Measurement was performed by using 0.5 g of a modified conjugated diene-based polymer as a sample and using a ultraviolet visible spectrophotometer (trade name "UV-1800" manufactured by Shimadzu Corporation) in accordance with JIS K 0101 44.3.1, and quantitative determination was performed by a molybdenum blue-spectrophotometric method. As a result, if a silicon atom was detected (low detection limit: 10 mass ppm), it was determined that the sample had a silicon atom.

Thus, it was confirmed that each of the modified conjugated diene-based polymers of Examples 1 to 5 and Comparative Examples 1 to 8 had a silicon atom.

(Example 1) Modified Conjugated Diene-Based Polymer (Sample 1)

A tank reactor equipped with a stirrer, that is, a tank pressure vessel including a stirrer and a jacket for temperature control, which had an internal volume of 10 L and had an inlet in a bottom portion and an outlet in a top portion, was used as a polymerization reactor.

1,3-Butadiene, styrene and n-hexane, from which water had been precedently eliminated, were mixed respectively at rates of 17.9 g/min, 9.8 g/min and 145.3 g/min.

In a static mixer provided in the middle of a pipe used for supplying the thus obtained mixed solution to the inlet of the reactor, n-butyllithium for performing a treatment for inactivating a remaining impurity was added at a rate of 0.130 mmol/min to be mixed, and the resultant mixed solution was continuously supplied to the bottom portion of the reactor.

In addition, a polar substance of 2,2-bis(2-oxolanyl) propane and a polymerization initiator of n-butyllithium were supplied respectively at rates of 0.0255 g/min and 0.225 mmol/min to the bottom portion of the polymerization reactor in which the mixed solution was vigorously stirred by the stirrer, so as to continuously perform a polymerization reaction.

The temperature was controlled so that a temperature of a polymer solution in the outlet in the top portion of the reactor could be 75° C. When the polymerization was sufficiently stabilized, a small amount of the polymerization solution prior to addition of a modifier was taken out through the outlet disposed in the top portion of the reactor, an antioxidant (BHT) was added thereto in a ratio of 0.2 g per 100 g of the resultant polymer, the solvent was then removed, and a Mooney viscosity at 110° C. and various molecular weights were measured.

Measurement results are shown in Table 1 together with other physical properties.

Next, to the polymer solution flown out through the outlet of the reactor, a modifier of tetrakis(3-triethoxysilylpropyl)-1,3-propanediamine (abbreviated as "B" in the table) was continuously supplied at a rate of 0.0563 mmol/min, and the polymer solution to which the modifier had thus been added was mixed in passing through the static mixer to cause a modification reaction.

To the polymer solution in which the modification reaction had been caused, an antioxidant (BHT) was continuously added at a rate of 0.055 g/min (a n-hexane solution) in a ratio of 0.2 g per 100 g of the resultant polymer so as to complete the modification reaction.

At the same time as the addition of the antioxidant, an oil (JOMO Process NC140 manufactured by JX Nippon Mining & Metals Corporation) was continuously added in a ratio of 37.5 g per 100 g of the resultant polymer, and the resultant was mixed by the static mixer.

The solvent was removed using a drum dryer from the polymer solution to obtain a modified conjugated diene-based polymer (sample 1).

The physical properties of the sample 1 are shown in Table 1.

Example 2

A modified conjugated diene-based polymer (sample 2) was obtained in the same manner as in Example 1 except that a rate of the polymerization initiator of n-butyllithium was changed to 0.173 mmol/min, that a rate of the polar substance was changed to 0.0200 g/min, that the modifier was changed to tetrakis(3-triethoxysilylpropyl)-1,3-propanediamine, and that an addition amount of the modifier was changed to 0.0433 mmol/min.

The physical properties of the sample 2 are shown in Table 1.

Example 3

A modified conjugated diene-based polymer (sample 3) was obtained in the same manner as in Example 1 except that a rate of the polymerization initiator of n-butyllithium was changed to 0.263 mmol/min, that a rate of the polar substance was changed to 0.0232 g/min, that the modifier was changed to tetrakis(3-triethoxysilylpropyl)-1,3-propanediamine, and that an addition amount of the modifier was changed to 0.0877 mmol/min.

The physical properties of the sample 3 are shown in Table 1.

Example 4

A modified conjugated diene-based polymer (sample 4) was obtained in the same manner as in Example 1 except that the modifier was changed to tetrakis(3-triethoxysilylpropyl)-1,3-propanediamin, and that an addition amount of the modifier was changed to 0.0366 mmol/min.

The physical properties of the sample 4 are shown in Table 1.

Example 5

A modified conjugated diene-based polymer (sample 5) was obtained in the same manner as in Example 1 except that the modifier was changed to tetrakis(3-triethoxysilylpropyl)-1,3-propanediamin, and that an addition amount of the modifier was changed to 0.0450 mmol/min.

The physical properties of the sample 5 are shown in Table 1.

Comparative Example 1

A modified conjugated diene-based polymer (sample 6) was obtained in the same manner as in Example 1 except that the modifier was changed to 1-[3-(triethoxysilyl)propyl]-4-methylpiperazine (abbreviated as "D" in the table), and that an addition amount of the modifier was changed to 0.0113 mmol/min.

The physical properties of the sample 6 are shown in Table 1.

Comparative Example 2

A modified conjugated diene-based polymer (sample 7) was obtained in the same manner as in Example 1 except that the modifier was changed to bis(trimethoxysilyl)ethane (abbreviated as "E" in the table), and that an addition amount of the modifier was changed to 0.0750 mmol/min.

The physical properties of the sample 7 are shown in Table 1.

Comparative Example 3

A modified conjugated diene-based polymer (sample 8) was obtained in the same manner as in Example 1 except that the modifier was changed to tris(3-trimethoxysilylpropyl) amine (abbreviated as "A" in the table), and that an addition amount of the modifier was changed to 0.0263 mmol/min.

The physical properties of the sample 8 are shown in Table 1.

Comparative Example 4

A modified conjugated diene-based polymer (sample 9) was obtained in the same manner as in Example 1 except that a rate of the polymerization initiator of n-butyllithium was changed to 0.169 mmol/min, that a rate of the polar substance was changed to 0.0173 g/min, that the modifier was changed to bis(trimethoxysilyl)ethane, and that an addition amount of the modifier was changed to 0.0577 mmol/min.

The physical properties of the sample 9 are shown in Table 1.

Comparative Example 5

A modified conjugated diene-based polymer (sample 10) was obtained in the same manner as in Example 1 except that the modifier was changed to tetrakis(3-triethoxysilylpropyl)-1,3-propanediamin, and that an addition amount of the modifier was changed to 0.0225 mmol/min.

The physical properties of the sample 10 are shown in Table 1.

Comparative Example 6

A modified conjugated diene-based polymer (sample 11) was obtained in the same manner as in Example 1 except that the modifier was changed to 1,3,5,-tris(3-trimethoxysilylpropyl)isocyanurate (abbreviated as "F" in the table) and that an addition amount of the modifier was changed to 0.0750 mmol/min.

The physical properties of the sample 11 are shown in Table 1.

Comparative Example 7

A modified conjugated diene-based polymer (sample 12) was obtained in the same manner as in Example 1 except that the modifier was changed to tris(3-trimethoxysilylpropyl) amine, and that an addition amount of the modifier was changed to 0.075 mmol/min.

The physical properties of the sample 12 are shown in Table 1.

Comparative Example 8

A modified conjugated diene-based polymer (sample 13) was obtained in the same manner as in Example 1 except that the modifier was changed to 2,2-dimethoxy-1-(3-trimethoxysilylpropyl)-1-aza-2-silacyclopentane (abbreviated as "C" in the table) and that an addition amount of the modifier was changed to 0.0750 mmol/min.

The physical properties of the sample 13 are shown in Table 1.

TABLE 1

| | | | Example 1 | Example 2 | Example 3 | Example 4 | Example 5 | Comparative Example 1 | Comparative Example 2 |
|---|---|---|---|---|---|---|---|---|---|
| | Modified Conjugated Diene-based Polymer (Sample No.) | | 1 | 2 | 3 | 4 | 5 | 6 | 7 |
| Polymerization Conditions | Butadiene | (g/min) | 17.9 | 17.9 | 17.9 | 17.9 | 17.9 | 17.9 | 17.9 |
| | Styrene | (g/min) | 9.8 | 9.8 | 9.8 | 9.8 | 9.8 | 9.8 | 9.8 |
| | n-Hexane | (g/min) | 145 | 145 | 145 | 145 | 145 | 145 | 145 |
| | Polymerization Temperature | (° C.) | 75 | 75 | 75 | 75 | 75 | 75 | 75 |
| | n-Butyllithium for treatment | (mmol/min) | 0.130 | 0.130 | 0.130 | 0.130 | 0.130 | 0.130 | 0.130 |
| | n-Butyllithium as polymerization initiator | (mmol/min) | 0.225 | 0.173 | 0.263 | 0.225 | 0.225 | 0.225 | 0.225 |
| | Amount of Polar Substance | (g/min) | 0.0255 | 0.0200 | 0.0232 | 0.0255 | 0.0255 | 0.0255 | 0.0255 |
| | Modifier Type | | B | B | B | B | B | D | |
| | Amount | (mmol/min) | 0.0563 | 0.0433 | 0.0877 | 0.0366 | 0.0450 | 0.0113 | 0.0750 |
| Physical Properties | Conjugated Diene-based Polymer before modification | (Physical Property 3) Weight Average Molecular Weight | ($10^4$ g/mol) | 36.0 | 46.1 | 28.2 | 36.1 | 35.9 | 36.5 | 35.5 |
| | | (Physical Property 3) Number Average Molecular Weight | ($10^4$ g/mol) | 17.8 | 22.5 | 14.2 | 17.8 | 17.7 | 18.2 | 17.5 |
| | | (Physical Property 4) Mooney Viscosity (110° C.) | | 43 | 60 | 28 | 43 | 43 | 47 | 46 |
| | | (Physical Property 3) Mw/Mn | | 2.02 | 2.05 | 1.98 | 2.03 | 2.03 | 2.01 | 2.03 |
| | Modified Conjugated Diene-based Polymer | (Physical Property 3) Weight Average Molecular Weight | ($10^4$ g/mol) | 80.2 | 101.4 | 56.8 | 88.0 | 84.1 | 42.8 | 43.8 |
| | | (Physical Property 3) Number Average Molecular Weight | ($10^4$ g/mol) | 37.7 | 47.2 | 29.1 | 41.4 | 39.3 | 20.3 | 24.5 |
| | | (Physical Property 3) Mw/Mn | | 2.13 | 2.15 | 1.95 | 2.13 | 2.14 | 2.11 | 1.79 |
| | | Number of —OR or —OH/Number of Si* | | 2.0 | 2.0 | 2.3 | 1.5 | 1.8 | 1.0 | 1.5 |
| | | (Physical Property 4) Mooney Viscosity of Polymer (100° C.) | | 65 | 81 | 45 | 88 | 78 | 39 | 45 |
| | | (Physical Property 1) Amount of Bound Styrene | (% by mass) | 35 | 35 | 35 | 35 | 35 | 35 | 35 |
| | | (Physical Property 2) Amount of Vinyl bond (Amount of 1,2-vinyl bond) | (mol %) | 40 | 41 | 39 | 40 | 39 | 40 | 41 |

TABLE 1-continued

|  |  |  |  |  |  |  |  |  |
|---|---|---|---|---|---|---|---|---|
| (Physical Property 5) Glass Transition Temperature | (° C.) | −25 | −24 | −25 | −25 | −25 | −25 | −24 |
| (Physical Property 6) Modification Ratio | (%) | 86 | 88 | 87 | 85 | 85 | 75 | 0 |

|  |  |  |  | Comparative Example 3 | Comparative Example 4 | Comparative Example 5 | Comparative Example 6 | Comparative Example 7 | Comparative Example 8 |
|---|---|---|---|---|---|---|---|---|---|
| | Modified Conjugated Diene-based Polymer (Sample No.) | | | 8 | 9 | 10 | 11 | 12 | 13 |
| Polymerization Conditions | Butadiene | | (g/min) | 17.9 | 17.9 | 17.9 | 17.9 | 17.9 | 17.9 |
| | Styrene | | (g/min) | 9.8 | 9.8 | 9.8 | 9.8 | 9.8 | 9.8 |
| | n-Hexane | | (g/min) | 145 | 145 | 145 | 145 | 145 | 145 |
| | Polymerization Temperature | | (° C.) | 75 | 75 | 75 | 75 | 75 | 75 |
| | n-Butyllithium for treatment | | (mmol/min) | 0.130 | 0.130 | 0.130 | 0.130 | 0.130 | 0.130 |
| | n-Butyllithium as polymerization initiator | | (mmol/min) | 0.225 | 0.169 | 0.225 | 0.225 | 0.225 | 0.225 |
| | Amount of Polar Substance | | (g/min) | 0.0255 | 0.0173 | 0.0255 | 0.0255 | 0.0255 | 0.0255 |
| | Modifier | Type | | A | E | B | F | A | C |
| | | Amount | (mmol/min) | 0.0263 | 0.0577 | 0.0225 | 0.0750 | 0.0750 | 0.0750 |
| Physical Properties | Conjugated Diene-based Polymer before modification | (Physical Property 3) Weight Average Molecular Weight | ($10^4$ g/mol) | 35.7 | 56.0 | 36.4 | 36.4 | 36.2 | 35.1 |
| | | (Physical Property 3) Number Average Molecular Weight | ($10^4$ g/mol) | 17.7 | 26.7 | 17.9 | 18.0 | 18.0 | 18.5 |
| | | (Physical Property 4) Mooney Viscosity (110° C.) | | 45 | 86 | 49 | 45 | 45 | 45 |
| | | (Physical Property 3) Mw/Mn | | 2.02 | 2.10 | 2.03 | 2.02 | 2.01 | 1.90 |
| | Modified Conjugated Diene-based Polymer | (Physical Property 3) Weight Average Molecular Weight | ($10^4$ g/mol) | 58.7 | 84.7 | 93.0 | 69.8 | 71.3 | 44.2 |
| | | (Physical Property 3) Number Average Molecular Weight | ($10^4$ g/mol) | 25.0 | 45.1 | 45.5 | 33.1 | 39.0 | 25.6 |
| | | (Physical Property 3) Mw/Mn | | 2.35 | 1.88 | 2.04 | 2.11 | 1.83 | 1.73 |
| | | Number of —OR or —OH/ Number of Si* | | 1.0 | 1.0 | 1.0 | 2.0 | 2.0 | 1.5 |
| | | (Physical Property 4) Mooney Viscosity of Polymer (100° C.) | | 44 | 67 | 93 | 58 | 61 | 42 |
| | | (Physical Property 1) Amount of Bound Styrene | (% by mass) | 35 | 35 | 35 | 35 | 35 | 35 |
| | | (Physical Property 2) Amount of Vinyl bond (Amount of 1,2-vinyl bond) | (mol %) | 40 | 40 | 41 | 40 | 40 | 39 |
| | | (Physical Property 5) Glass Transition Temperature | (° C.) | −25 | −25 | −25 | −25 | −25 | −25 |
| | | (Physical Property 6) Modification Ratio | (%) | 68 | 0 | 85 | 84 | 85 | 85 |

In Table 1, "*" is a calculated value of a molar ratio of the alkoxy group and/or the hydroxyl group to the silicon atom contained in the modified conjugated diene-based polymer from the addition amounts of the polymer initiator and the modifier.

When the reactable group in the modifier added was less than the addition amount of the polymerization initiator, "1.0" is shown.

[Physical Properties of Vulcanizate Evaluation (1)]

Examples 6 to 10, Comparative Examples 9 to 16

The samples 1 to 13 shown in Tables 1 were used as starting material rubbers, and rubber compositions respectively comprising the starting material rubbers were obtained in accordance with the following compositions:

Modified conjugated diene-based polymer (any of the samples 1 to 13): 100 parts by mass (oil removed)

Silica 1 (trade name "Ultrasil 7000GR" manufactured by Evonik Degussa Gmbh, nitrogen adsorption specific surface area: 170 $m^2$/g): 75.0 parts by mass Carbon black (trade name "SEAST KH ($N^{339}$)" manufactured by Tokai Carbon Co., Ltd.): 5.0 parts by mass Silane coupling agent (trade name "Si75" manufactured by Evonik Degussa Gmbh, bis(triethoxysilylpropyl)disulfide): 6.0 parts by mass S-RAE oil (trade name "Process NC140" manufactured by JX Nippon Mining & Metals Corporation): 37.5 parts by mass Zinc oxide: 2.5 parts by mass Stearic acid: 1.0 part by mass Anti-ageing agent: (N-(1,3-dimethylbutyl)-N'-phenyl-p-phenylenediamine): 2.0 parts by mass Sulfur: 2.2 parts by mass Vulcanization accelerator 1 (N-cyclohexyl-2-benzothiazyl sulfinamide): 1.7 parts by mass Vulcanization accelerator 2 (diphenylguanidine): 2.0 parts by mass Total: 239.4 parts by mass The above-described materials were kneaded as follows to obtain a rubber composition.

A sealed mixer (internal volume: 0.3 L) equipped with a temperature controller was used, and as a first stage of kneading, the starting material rubber (any of the samples 1 to 13), the fillers (the silica and the carbon black), the silane coupling agent, the process oil, the zinc oxide and the stearic acid were kneaded under conditions of a filling rate of 65% and a rotator rotational speed of 30 to 50 rpm.

Here, the temperature of the sealed mixer was controlled to obtain the rubber composition (compound) at a discharging temperature of 155 to 160° C.

Next, as a second stage of the kneading, the compound obtained as described above was cooled to room temperature, the antioxidant was added thereto, and the resultant was kneaded again to improve the dispersibility of the silica. Also in this case, the discharging temperature for the compound was adjusted to 155 to 160° C. by the temperature control of the mixer.

After the cooling, as a third stage of the kneading, sulfur and the vulcanization accelerators 1 and 2 were added to and mixed with the resultant compound by an open roll set to 70° C.

Thereafter, the resultant was molded and vulcanized at 160° C. for 20 minutes by a vulcanizing press.

The rubber composition was evaluated before and after the vulcanization.

Specifically, the evaluation was performed by methods described below. Results are shown in [Tables 2].

[Evaluation 1] Mooney Viscosity of Compound

The compound obtained as described above after the second stage of the kneading and before the third stage of the kneading was used as a sample, and the viscosity was measured using a Mooney viscometer in accordance with JIS K6300-1 after preheating the sample at 130° C. for 1 minute, and after rotating a rotor for 4 minutes at 2 rpm.

Results are shown as indexes obtained assuming that the result of Comparative Example 10 was 100.

A smaller index indicates better processability.

[Evaluation 2] Viscoelasticity Parameter

A viscoelasticity testing machine "ARES" manufactured by Rheometric Scientific, Inc. was used to measure a viscoelasticity parameter in a torsion mode.

Each measurement value was shown as an index obtained assuming that the result of the rubber composition of Comparative Example 10 was 100.

A tan δ measured at 0° C. at a frequency of 10 Hz and strain of 1% was used as an index of the wet grip characteristics.

A larger index indicates better wet grip characteristics.

Besides, a tan δ measured at 50° C. at a frequency of 10 Hz and strain of 3% was used as an index of low hysteresis loss property.

A smaller index indicates better low hysteresis loss property.

[Evaluation 3] Tensile Strength and Tensile Elongation

The tensile strength and the tensile elongation were measured in accordance with a tensile test of JIS K6251, and results are shown as indexes obtained assuming that the result of Comparative Example 10 was 100.

A larger index indicates better tensile strength and better tensile elongation.

[Evaluation 4] Abrasion Resistance

An Acron abrasion tester (manufactured by Yasuda Seiki Seisakusho, Ltd.) was used to measure an abrasion amount through 1000 rotations at a load of 44.4 N in accordance with JIS K6264-2, and results are shown as indexes obtained assuming that the result of Comparative Example 10 was 100.

A larger index indicates better abrasion resistance.

[Evaluation 5] Silica Dispersibility

The compound after the second stage of the kneading and before the third stage of the kneading was used as a sample, and the elastic modulus (G') of the compound was measured while a strain was changed from 0.1% to 1200% using a rotorless die type rheometer, RPA2000, manufactured by Alpha Technologies under conditions of a temperature of 100° C. and a frequency of 0.5 Hz. ΔG', obtained by subtracting a value of G' at a strain of 1200% from a value of G' at a strain of 0.5%, was used as an index of silica dispersibility, and the measurement results are shown as indexes obtained assuming that the result of Comparative Example 10 was 100.

A smaller index indicates better dispersibility of silica.

Evaluation results of [Examples 6 to 10] and [Comparative Examples 9 to 16], wherein 75 parts by mass of silica was added based on 100 parts by mass of the modified conjugated diene-based polymer, are shown in [Tale 2] below.

[Physical Properties of Vulcanizate Evaluation (2)]

Examples 11 to 15, Comparative Examples 17 to 24

The samples 1 to 13 shown in Table 1 were used as starting material rubbers, and rubber compositions respectively comprising the starting material rubbers were obtained in accordance with the following compositions:

Modified conjugated diene-based polymer (any of the samples 1 to 13): 70 parts by mass (oil removed)

high-cis BR (Grade name "U150" manufactured by UBE INDUSTRIES, LTD.: 30 parts by mass Silica (trade name "Zeosil Premium" manufactured by SOLVAY, nitrogen adsorption specific surface area 215 m$^2$/g): 90.0 parts by mass Carbon black (trade name "SEAST KH (N339)" manufactured by Tokai Carbon Co., Ltd.): 5.0 parts by mass Silane coupling agent (trade name "Si75" manufactured by Evonik Degussa Gmbh, bis(triethoxysilylpropyl)disulfide): 7.2 parts by mass S-RAE oil (trade name "Process NC140" manufactured by JX Nippon Mining & Metals Corporation): 30.0 parts by mass Zinc oxide: 2.5 parts by mass Stearic acid: 2.0 part by mass Anti-ageing agent: (N-(1,3-dimethylbutyl)-N'-phenyl-p-phenylenediamine): 2.0 parts by mass Sulfur: 2.2 parts by mass Vulcanization accelerator 1 (N-cyclohexyl-2-benzothiazyl sulfinamide): 1.7 parts by mass Vulcanization accelerator 2 (diphenylguanidine): 2.0 parts by mass
Total: 244.6 parts by mass A starting material rubber (any of samples 1 to 13) and the above-described materials were kneaded, molded, and vulcanized in the same manner as in [Physical Properties of Vulcanizate Evaluation (1)].

As in the [Physical Properties of Vulcanizate Evaluation (1)], the rubber composition was evaluated before and after the vulcanization and the results are shown as indexes obtained assuming that the result of Comparative Example 18 was 100.

Evaluation results of [Examples 11 to 15] and [Comparative Examples 17 to 24], wherein 90 parts by mass of silica was added based on 100 parts by mass of the above-described rubber component comprising the modified conjugated diene-based polymer and a prescribed rubber material, are shown in [Tale 3] below.

TABLE 2

| | | | Example 6 | Example 7 | Example 8 | Example 9 | Example 10 | Comparative Example 9 | Comparative Example 10 |
|---|---|---|---|---|---|---|---|---|---|
| Modified Diene-based Polymer (Sample No.) | | | 1 | 2 | 3 | 4 | 5 | 6 | 7 |
| (Physical Property 4) Mooney Viscosity (100° C.) of Modified Diene-based Polymer | | | 65 | 81 | 45 | 88 | 78 | 39 | 45 |
| (Evaluation 1) Mooney Viscosity (130° C.) of Compound | | index | 99 | 115 | 89 | 106 | 103 | 103 | 100 |
| Physical Properties of Vulcanizate | (Evaluation 2) 50° C. tanδ (strain 3%) | index | 78 | 84 | 82 | 85 | 81 | 95 | 100 |
| | (Evaluation 2) 0° C. tanδ (strain 1%) | index | 123 | 115 | 120 | 116 | 119 | 107 | 100 |
| | (Evaluation 3) Tensile Strength | index | 109 | 115 | 107 | 117 | 113 | 98 | 100 |
| | (Evaluation 3) Tensile Elongation | index | 109 | 117 | 109 | 113 | 111 | 97 | 100 |
| | (Evaluation 4) Abrasion Resistance | index | 111 | 113 | 108 | 112 | 112 | 98 | 100 |
| | (Evaluation 5) Silica Dispersibility | index | 75 | 74 | 73 | 80 | 78 | 96 | 100 |

| | | | Comparative Example 11 | Comparative Example 12 | Comparative Example 13 | Comparative Example 14 | Comparative Example 15 | Comparative Example 16 |
|---|---|---|---|---|---|---|---|---|
| Modified Diene-based Polymer (Sample No.) | | | 8 | 9 | 10 | 11 | 12 | 13 |
| (Physical Property 4) Mooney Viscosity (100° C.) of Modified Diene-based Polymer | | | 44 | 67 | 93 | 58 | 61 | 42 |
| (Evaluation 1) Mooney Viscosity (130° C.) of Compound | | index | 85 | 120 | 98 | 97 | 97 | 95 |
| Physical Properties of Vulcanizate | (Evaluation 2) 50° C. tanδ (strain 3%) | index | 94 | 108 | 85 | 87 | 85 | 87 |
| | (Evaluation 2) 0° C. tanδ (strain 1%) | index | 105 | 93 | 116 | 114 | 116 | 114 |
| | (Evaluation 3) Tensile Strength | index | 99 | 113 | 114 | 107 | 108 | 102 |
| | (Evaluation 3) Tensile Elongation | index | 98 | 114 | 116 | 109 | 110 | 103 |
| | (Evaluation 4) Abrasion Resistance | index | 108 | 109 | 107 | 99 | 100 | 103 |
| | (Evaluation 5) Silica Dispersibility | index | 89 | 101 | 87 | 83 | 81 | 90 |

TABLE 3

| | | | Example 11 | Example 12 | Example 13 | Example 14 | Example 15 | Comparative Example 17 | Comparative Example 18 |
|---|---|---|---|---|---|---|---|---|---|
| Modified Diene-based Polymer (Sample No.) | | | 1 | 2 | 3 | 4 | 5 | 6 | 7 |
| (Physical Property 4) Mooney Viscosity (100° C.) of Modified Diene-based Polymer | | | 65 | 81 | 45 | 88 | 78 | 39 | 45 |
| (Evaluation 1) Mooney Viscosity (130° C.) of Compound | | index | 73 | 90 | 68 | 79 | 77 | 92 | 100 |
| Physical Properties of Vulcanizate | (Evaluation 2) 50° C. tanδ (strain 3%) | index | 53 | 59 | 51 | 60 | 57 | 95 | 100 |
| | (Evaluation 2) 0° C. tanδ (strain 1%) | index | 114 | 114 | 119 | 111 | 113 | 102 | 100 |

TABLE 3-continued

|  |  |  |  |  |  |  |  |  |
|---|---|---|---|---|---|---|---|---|
| (Evaluation 3) Tensile Strength | index | 112 | 116 | 111 | 119 | 116 | 102 | 100 |
| (Evaluation 3) Tensile Elongation | index | 114 | 110 | 113 | 118 | 116 | 102 | 100 |
| (Evaluation 4) Abrasion Resistance | index | 126 | 130 | 119 | 127 | 127 | 106 | 100 |
| (Evaluation 5) Silica Dispersibility | index | 50 | 49 | 45 | 60 | 56 | 92 | 100 |

|  |  |  | Comparative Example 19 | Comparative Example 20 | Comparative Example 21 | Comparative Example 22 | Comparative Example 23 | Comparative Example 24 |
|---|---|---|---|---|---|---|---|---|
| Modified Diene-based Polymer (Sample No.) | | | 8 | 9 | 10 | 11 | 12 | 13 |
| (Physical Property 4) Mooney Viscosity (100° C.) of Modified Diene-based Polymer | | | 44 | 67 | 93 | 58 | 61 | 42 |
| (Evaluation 1) Mooney Viscosity (130° C.) of Compound | | index | 81 | 112 | 78 | 77 | 76 | 84 |
| Physical Properties of Vulcanizate | (Evaluation 2) 50° C. tanδ (strain 3%) | index | 81 | 102 | 65 | 67 | 65 | 89 |
|  | (Evaluation 2) 0° C. tanδ (strain 1%) | index | 106 | 99 | 109 | 111 | 113 | 106 |
|  | (Evaluation 3) Tensile Strength | index | 115 | 97 | 115 | 106 | 107 | 106 |
|  | (Evaluation 3) Tensile Elongation | index | 115 | 95 | 113 | 104 | 103 | 106 |
|  | (Evaluation 4) Abrasion Resistance | index | 116 | 107 | 118 | 111 | 113 | 114 |
|  | (Evaluation 5) Silica Dispersibility | index | 77 | 102 | 75 | 65 | 63 | 80 |

As shown in [Table 2], Example 6 (sample 1) when compared to Comparative Example 12 (sample 9), Comparative Example 14 (sample 11), and Comparative Example 15 (sample 12), and also Example 11 (sample 1) shown in [Table 3] when compared to Comparative Example 20 (sample 9), Comparative Example 22 (sample 11), and Comparative Example 23 (sample 12), had good silica dispersibility when in the form of a compound and had excellent balance between the low hysteresis loss property and the wet skit resistance and abrasion resistance when in the form of a vulcanizate, and had practically sufficient fracture characteristics.

Example 8 (sample 3) shown in [Table 2] when compared to Comparative Example 9 (sample 6), Comparative Example 10 (sample 7), Comparative Example 11 (sample 8), and Comparative Example 16 (sample 13), and also Example 13 (sample 3) shown in [Table 3] when compared to Comparative Example 17 (sample 6), Comparative Example 18 (sample 7), Comparative Example 19 (sample 8), and Comparative Example 24 (sample 13) had low Mooney viscosities when in the form of a compound and thus had good processability although Mooney viscosities were about the same. Besides, the silica dispersibility was good when in the form of a compound, the balance between the low hysteresis loss property and the wet skit resistance, and abrasion resistance were excellent when in the form of a vulcanizate, and had practically sufficient fracture characteristics.

Example 7 (sample 2), Example 9 (sample 4), and Example 10 (sample 5) shown in [Table 2] when compared to Comparative Example 13 (sample 10), and also Example 12 (sample 2), Example 14 (sample 4), and Example 15 (sample 5) shown in [Table 3] when compared to Comparative Example 21 (sample 10) had good silica dispersibility when in the form of a compound, and had excellent balance between the low hysteresis loss property and the wet skit resistance and abrasion resistance when in the form of a vulcanizate, and had practically sufficient fracture characteristics.

This application is based upon the prior Japanese patent application (Japanese Patent Application No. 2016-161379), filed to the Japanese Patent Office on Aug. 19, 2016, the entire contents of which are incorporated herein by reference.

INDUSTRIAL APPLICABILITY

A modified conjugated diene-based polymer according to the present invention is industrially applicable in the fields of tire treads, vehicle interiors and exteriors, anti-vibration rubbers, belts, shoes, foams and various industrial products.

The invention claimed is:

1. A modified conjugated diene-based polymer having a weight average molecular weight of 20×10$^4$ or more and 300 ×10$^4$ or less, and having a star-branched structure with a conjugated diene-based polymer chain bonded to a modifier residue, wherein the modifier residue has at least 4 silicon atoms, and alkoxy groups and/or hydroxyl groups and the conjugated diene-based polymer chain is bonded to the silicon atom, wherein the number of the alkoxy groups and/or the hydroxyl groups in the modifier residue is larger than the number of the silicon atoms on average, and the modified conjugated diene-based polymer is represented by the following general formula (2);

(2)

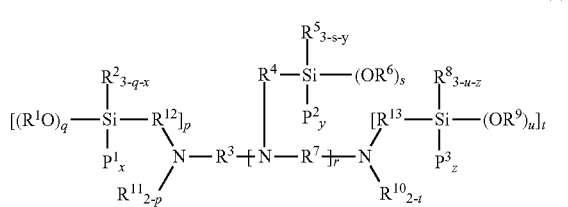

wherein $P^1$ to $P^3$ each independently represent a conjugated diene-based polymer chain; $R^3$, $R^4$, $R^7$ $R^{12}$ and $R^{13}$ each independently represent an alkylene group having 1 to 20 carbon atoms; $R^2$, $R^5$ and $R^8$ each independently represent an alkyl group having 1 to 20 carbon atoms; $R^1$, $R^6$ and $R^9$ each independently represent a hydrogen atom or an alkyl group having 1 to 20 carbon atoms; and $R^{10}$ and $R^{11}$ each independently represent a hydrogen atom or an alkyl group having 1 to 20 carbon atoms; x, y and z each independently represent an integer of 1 to 2; p and t each independently represent an integer of 1 to 2; q, s and u each independently represent an integer of 0 to 3; r represents an integer of 0 to 6; the number of the conjugated diene-based polymer chain $((x \times p)+(y \times r)+(z \times t))$ is an integer of 3 to 20; $((q \times p)+(s \times r)+(u \times t))$ exceeds the number of the silicon atoms, and a ratio $((q \times p)+(s \times r)+(u \times t))/((x \times p)+(y \times r) +(z \times t))$ exceeds 0.5.

2. The modified conjugated diene-based polymer according to claim 1, wherein the number of the alkoxy groups and/or the hydroxyl groups in the modifier residue is 1.2 times or more of the number of the silicon atoms on average.

3. The modified conjugated diene-based polymer according to claim 2, wherein the modifier residue has at least 2 nitrogen atoms and at least 4 silicon atoms.

4. A rubber composition comprising:
a rubber component and 5.0 parts by mass or more and 150 parts by mass or less of a filler based on 100 parts by mass of the rubber component,
wherein the rubber component comprises 10% by mass or more of the modified conjugated diene-based polymer according to claim 3 based on a total amount of the rubber component.

5. A tire comprising the rubber composition according to claim 4.

6. The modified conjugated diene-based polymer according to claim 2, represented by the following general formula (2);

(2)

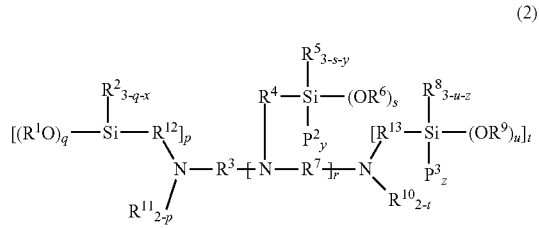

wherein $P^1$ to $P^3$ each independently represent a conjugated diene-based polymer chain; $R^3$, $R^4$, $R^7$ $R^{12}$ and $R^{13}$ each independently represent an alkylene group having 1 to 20 carbon atoms; $R^2$, $R^5$ and $R^8$ each independently represent an alkyl group having 1 to 20 carbon atoms; $R^1$, $R^6$ and $R^9$ each independently represent a hydrogen atom or an alkyl group having 1 to 20 carbon atoms; and $R^{10}$ and $R^{11}$ each independently represent a hydrogen atom or an alkyl group having 1 to 20 carbon atoms; x, y and z each independently represent an integer of 1 to 2; p and t each independently represent an integer of 1 to 2; q, s and u each independently represent an integer of 0 to 3; r represents an integer of 0 to 6; the number of the conjugated diene-based polymer chain $((x \times p)+(y \times r)+(z \times t))$ is an integer of 3 to 20; $((q \times p)+(s \times r)+(u \times t))$ exceeds the number of the silicon atoms, and a ratio $((q \times p)+(s \times r)+(u \times t))/((x \times p)+(y \times r)+(z \times t))$ exceeds 0.5.

7. A rubber composition comprising:
a rubber component and 5.0 parts by mass or more and 150 parts by mass or less of a filler based on 100 parts by mass of the rubber component,
wherein the rubber component comprises 10% by mass or more of the modified conjugated diene-based polymer according to claim 6 based on a total amount of the rubber component.

8. A tire comprising the rubber composition according to claim 7.

9. The modified conjugated diene-based polymer according to claim 1, wherein the modifier residue has at least 2 nitrogen atoms and at least 4 silicon atoms.

10. An oil-extended modified conjugated diene-based polymer comprising:
100 parts by mass of the modified conjugated diene-based polymer according to claims 1, and
1 to 60 parts by mass of an extender oil.

11. A rubber composition comprising:
a rubber component and 5.0 parts by mass or more and 150 parts by mass or less of a filler based on 100 parts by mass of the rubber component,
wherein the rubber component comprises 10% by mass or more of the modified conjugated diene-based polymer according to claim 1 based on a total amount of the rubber component.

12. A tire comprising the rubber composition according to claim 11.

13. The modified conjugated diene-based polymer according to claim 1, wherein a modification ratio of the modified conjugated diene-based polymer is 30% by mass or more.

14. The modified conjugated diene-based polymer according to claim 1, wherein a modification ratio of the modified conjugated diene-based polymer is 50% by mass or more.

15. The modified conjugated diene-based polymer according to claim 1, wherein a modification ratio of the modified conjugated diene-based polymer is 70% by mass or more.

16. The modified conjugated diene-based polymer according to claim 1, wherein the modified conjugated diene-based polymer comprises an oil-extended modified conjugated diene-based polymer in which an extender oil is added to the modified conjugated diene-based polymer.

17. The modified conjugated diene-based polymer according to claim 16, wherein the extender oil comprises an aroma oil, a naphthenic coil and a paraffin oil.

* * * * *